United States Patent
He et al.

(10) Patent No.: US 11,943,467 B2
(45) Date of Patent: Mar. 26, 2024

(54) AFFINE MOTION ESTIMATION FOR AFFINE MODEL-BASED VIDEO CODING

(71) Applicant: VID SCALE, INC., Wilmington, DE (US)

(72) Inventors: Yuwen He, San Diego, CA (US); Xiaoyu Xiu, San Diego, CA (US); Yan Ye, San Diego, CA (US); Jiancong Luo, Skillman, NJ (US)

(73) Assignee: VID Scale, Inc., Wilmington, DE (US)

( * ) Notice: Subject to any disclaimer, the term of this patent is extended or adjusted under 35 U.S.C. 154(b) by 68 days.

(21) Appl. No.: 17/278,202

(22) PCT Filed: Sep. 20, 2019

(86) PCT No.: PCT/US2019/052101
§ 371 (c)(1),
(2) Date: Mar. 19, 2021

(87) PCT Pub. No.: WO2020/061423
PCT Pub. Date: Mar. 26, 2020

(65) Prior Publication Data
US 2021/0400300 A1 Dec. 23, 2021
US 2023/0037273 A2 Feb. 2, 2023

Related U.S. Application Data

(60) Provisional application No. 62/734,783, filed on Sep. 21, 2018, provisional application No. 62/812,979, filed on Mar. 2, 2019.

(51) Int. Cl.
H04N 19/52 (2014.01)
H04N 19/147 (2014.01)
H04N 19/176 (2014.01)

(52) U.S. Cl.
CPC .......... *H04N 19/52* (2014.11); *H04N 19/147* (2014.11); *H04N 19/176* (2014.11)

(58) Field of Classification Search
CPC ..... H04N 19/176; H04N 19/52; H04N 19/147
See application file for complete search history.

(56) References Cited

U.S. PATENT DOCUMENTS

| 7,200,174 B2 | 4/2007 | Lainema et al. | |
|---|---|---|---|
| 2014/0348241 A1* | 11/2014 | Lim | H04N 19/70 375/240.16 |

(Continued)

FOREIGN PATENT DOCUMENTS

WO 2018/231700 A1 12/2018

OTHER PUBLICATIONS

"BMS—2.0 Reference Software", Available at <https://vcgit.hhi.fraunhofer.de/jvet/VVCSoftware_BMS/tags/BMS-2.1rc1>, 1 page.

(Continued)

*Primary Examiner* — Zhubing Ren
(74) *Attorney, Agent, or Firm* — Condo Roccia Koptiw LLP

(57) ABSTRACT

Systems, methods, and instrumentalities for affine motion estimation for affine model-based video coding may be disclosed herein. A first motion vector (MV) set including one or more MVs may be derived for a first coding block. The MVs may be control point MVs (CPMVs) and the MVs may be derived by performing affine motion estimation (ME) associated with the first coding block. The first MV set may be added to a recently-estimated MV list. A head of the recently-estimated MV list may be set to the first MV set. The recently-estimated MV list may be empty or may contain one or more previously-added MV sets.

20 Claims, 17 Drawing Sheets

(56) References Cited

U.S. PATENT DOCUMENTS

| | | | | |
|---|---|---|---|---|
| 2018/0192071 | A1* | 7/2018 | Chuang | H04N 19/517 |
| 2018/0270500 | A1* | 9/2018 | Li | H04N 19/52 |
| 2018/0359483 | A1* | 12/2018 | Chen | H04N 19/70 |
| 2019/0116374 | A1* | 4/2019 | Zhang | H04N 19/513 |
| 2019/0261018 | A1* | 8/2019 | Bordes | H04N 19/52 |
| 2019/0297325 | A1* | 9/2019 | Lim | H04N 19/119 |
| 2019/0364296 | A1* | 11/2019 | Zhao | H04N 19/176 |

OTHER PUBLICATIONS

"JEM—7.0 Reference Software", Available at <https://jvet.hhi.fraunhofer.de/svn/svn_HMJEMSoftware/tags/HM-16.6-JEM-7.0>, 1 page.

"JM Reference Software JM16.1", Available at <http://iphome.hhi.de/suehring/tml/download/jm16.1.zip>, Sep. 2009.

"VTM—2.0.1 Reference Software", Available at <https://vcgit.hhi.fraunhofer.de/jvet/VVCSoftware_VTM/tags/VTM-2.0.1>, 1 page.

Alshina et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.

Bordes et al., "Description of SDR, HDR and 360° Video Coding Technology Proposal by Qualcomm and Technicolor—Medium Complexity Version", JVET-J0022R1, Qualcomm, Technicolor, Joint Video Experts Team (JVET) of ITU-T SG 16 WP 3 and ISO/IEC JTC 1/SC 29/WG 11, 10th Meeting: San Diego, US, Apr. 10-20, 2018, 83 pages.

Bross et al., "High Efficiency Video Coding (HEVC) Text Specification Draft 10", JCTVC-L1003 v_1, Joint Collaborative Team on Video Coding (JCT-VC) of ITU-T SG 16 WP 3 and ISO/IEC JTC 1/SC 29/WG 11, 12th Meeting, Geneva, CH, Jan. 2013.

Bross, "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting, San Diego, USA, Apr. 2018, 40 pages.

Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Chen et al., "Coding Tools Investigation for Next Generation Video Coding", ITU-T SG16, COM 16-C 806-E, Jan. 2015, 7 pages.

Han et al., "CE4.1.3: Affine Motion Compensation Prediction", JVET-K0337, Joint Video Exploration Team (JVET) of ITU-T SG 16 WP 3 and ISO/IEC JTC 1/SC 29/WG 11, 11th Meeting, Ljubljana, SI, Jul. 2018, 6 pages.

ITU-T, "Advanced Video Coding for Generic Audiovisual Services", ITU-T Rec H.264 and ISO/IEC/MPEG 4 Part 10, Nov. 2007, 564 pages.

Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.

Lin et al., "Affine Transform Prediction for Next Generation Video Coding", ISO/IEC JTC1/SC29/WG11 MPEG2015/ m37525, Geneva, Switzerland, Oct. 2015, 10 pages.

Ohm et al., "Report of AHG on Future Video Coding Standardization Challenges", AHG, ISO/IEC JTC1/SC29/WG11 MPEG2014/ M36782, Warsaw, Poland, Jun. 2015, 4 pages.

Segall et al., "Joint Call for Proposals on Video Compression with Capability beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.

SMPTE, "VC-1 Compressed Video Bitstream Format and Decoding Process", SMPTE 421M, Apr. 2006, 493 pages.

Wikipedia, "Sobel Filter", Available at <https://en.wikipedia.org/wiki/Sobel_operator>, Feb. 20, 2021, pp. 1-8.

Zhang et al., "CE4-Related: History-Based Motion Vector Prediction", JVET-K0104-V5, Bytedance Inc., Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-7.

* cited by examiner (a)

(b)

(c)

(d)

(e)

(f)

AFFINE MOTION ESTIMATION FOR AFFINE MODEL-BASED VIDEO CODING

CROSS-REFERENCE TO RELATED APPLICATIONS

This is the National Stage Entry under 35 U.S.C. § 371 of Patent Cooperation Treaty Application No. PCT/US2019/052101, filed Sep. 20, 2019, which application claims the benefit of U.S. Provisional Application Ser. No. 62/734,783, filed Sep. 21, 2018, and U.S. Provisional Application Ser. No. 62/812,979, filed Mar. 2, 2019, the contents of which are incorporated by reference herein.

BACKGROUND

Video coding systems may be used to compress digital video signals, e.g., to reduce the storage and/or transmission bandwidth needed for such signals. Video coding systems may include block-based, wavelet-based, and/or object-based systems. A block-based hybrid video coding system may be deployed.

SUMMARY

Systems, methods, and instrumentalities for motion estimation for video coding may be disclosed herein. The starting point of motion estimation may be selected based at least in part on one or more MV sets in a recently-estimated MV list. Selection of the starting point of motion estimation may be performed by an encoder and/or a decoder. The encoder and/or decoder may be a wireless transmit/receive unit (WTRU). For example, a first motion vector (MV) set including one or more MVs may be derived for a first coding block. The MVs may be control point MVs (CPMVs) and the MVs may be derived by performing affine motion estimation (ME) associated with the first coding block. The first MV set may be added to a recently-estimated MV list. A head of the recently-estimated MV list may be set to the first MV set. The recently-estimated MV list may be empty or may contain one or more previously-added MV sets. For example, the recently-estimated MV list may contain one or more searched MV sets for motion estimation, with each searched MV set in the recently-estimated MV list being an MV set selected for a neighboring block of the second coding block, a sibling block of the second coding block, a parent block of the second coding block, or a child block of the parent block of the second coding block by a different tree partition. The recently-estimated MV list may be, for example, a first-in-first-out (FIFO) list with a size (e.g., which may be four). A starting point for motion estimation may be selected for a second coding block based at least in part on one or more MV sets in the recently-estimated MV list and one or more MV predictors. The second coding block may be encoded based on the selected starting point. For example, ME (e.g., affine ME) associated with the second coding block based on the selected starting point.

A first tree partition may partition a parent block of the second coding block into the second coding block and at least one sibling block. A second tree partition may partition the parent block of the second coding block into one or more (e.g., two) child blocks). The first coding block may be a neighboring block of the second coding block, a sibling block of the second coding block, a parent block of the second coding block, or a child block of the parent block by the second tree partition. If the second coding block is a last block in the first tree partition, the head of the MV list may be set to be an MV set associated with the parent block.

The recently-estimated MV list may be associated with a maximum size. It may be determined whether the size of the recently-estimated MV list is equal to the maximum size, for example after deriving MVs for a coding block (e.g., the first coding block). If the recently-estimated MV list is equal to the maximum size, a least-recently-estimated MV set may be removed from the recently-estimated MV list prior to adding the MVs for the coding block.

A MV set and/or an MVP set may be determined. The MV set may include, for example, one or more (e.g., three) MVs (e.g., control point MVs). For example, the MV set may be denoted as $\{MV_0, MV_1, MV_2\}$. The MVP set may include, for example, one or more (e.g., three) MVPs (e.g., affine MVPs). For example, the MV set may be denoted as $\{MVP_0, MVP_1, MVP_2\}$. It may be determined whether a first MV of the MV set (e.g., $MV_1$) is equal to a first MVP of the MVP set (e.g., $MVP_1$). If the first MV is not equal to the first MVP, an MV-MVP combined set may be generated by replacing the first MV in the MV set with the first MVP. A bit cost (e.g., an ME cost) of the MV-MVP combined set may be determined. For example, the bit cost may be determined based on a prediction error and/or a respective bit cost for each MV in the MV-MVP combined set. The MV set or the MV-MVP combined set may be selected as a best set based on the bit cost of the MV-MVP combined set. The bit cost of the MV-MVP combined set may be compared with a bit cost of the MV set. For example, if the bit cost of the MV-MVP combined set is lower than the bit cost of the MV set, the MV-MVP combined set may be selected. Otherwise, the MV set may be selected.

It may be determined whether a second MV of the MV set (e.g., $MV_2$) is equal to a second MVP of the MVP set (e.g., $MVP_2$). If the second MV is not equal to the second MVP, the second MV may be replaced with the second MVP in the MV-MVP combined set to generate a second MV-MVP combined set (e.g., which may be denoted as $\{MV_0, MVP_1, MVP_2\}$. A bit cost (e.g., an ME cost) of the second MV-MVP combined set may be determined. The bit cost of the second MV-MVP combined set may be compared to the cost of the current best set and an updated best set may be selected. For example, if the bit cost of the second MV-MVP combined set is lower than the bit cost of the current best set, the second MV-MVP combined set may be selected as the updated best set. Otherwise, the current best set may be selected as the updated best set.

DETAILED DESCRIPTION

Figure 1A:
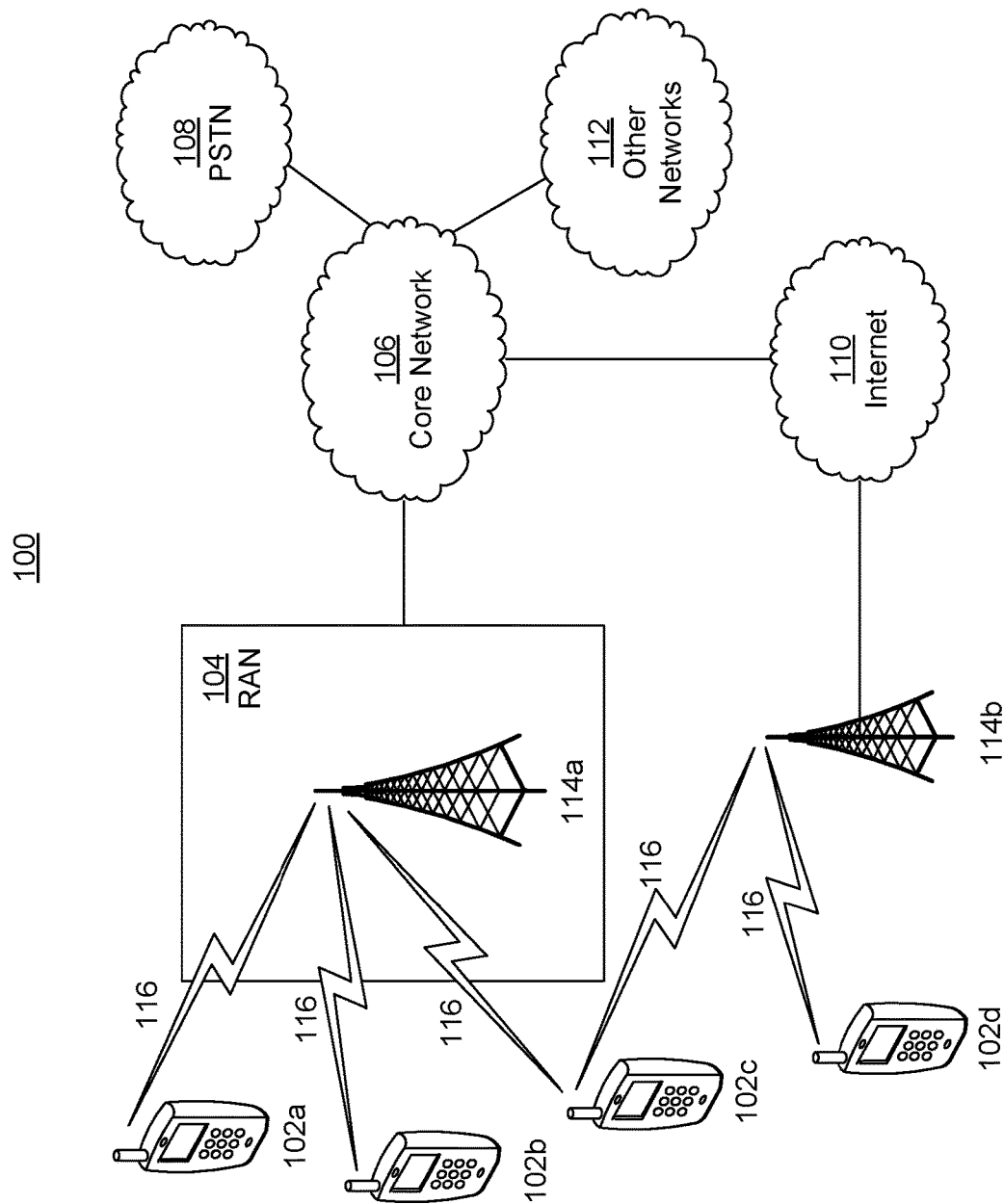
FIG. 1A is a system diagram illustrating an example communications system.

A more detailed understanding may be had from the following description, given by way of example in conjunction with the accompanying drawings wherein:

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In examples, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
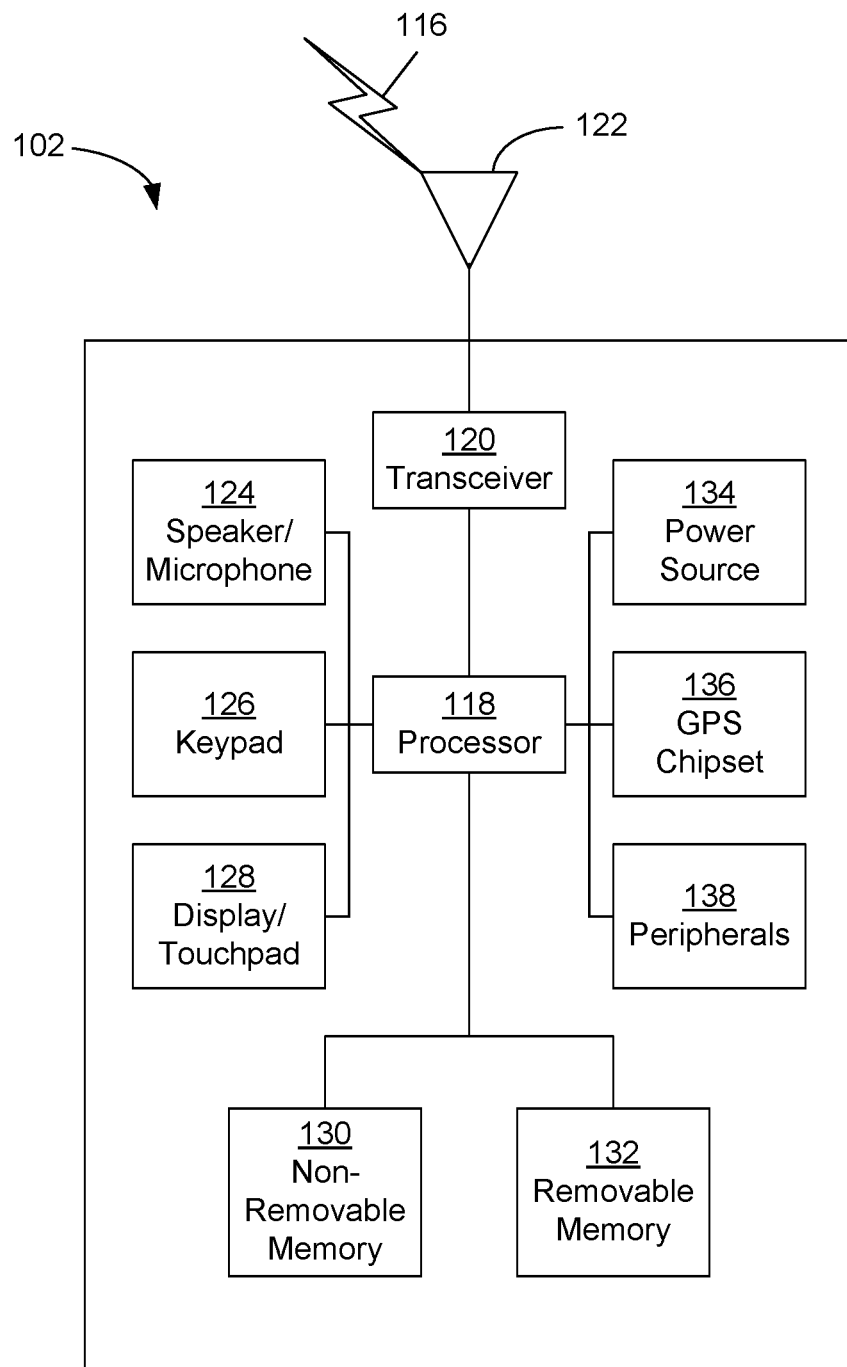
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WRTU 102 may include a half-duplex radio for which transmission and reception of some or all of the signals (e.g., associated with particular subframes for either the UL (e.g., for transmission) or the downlink (e.g., for reception)).

Figure 1C:
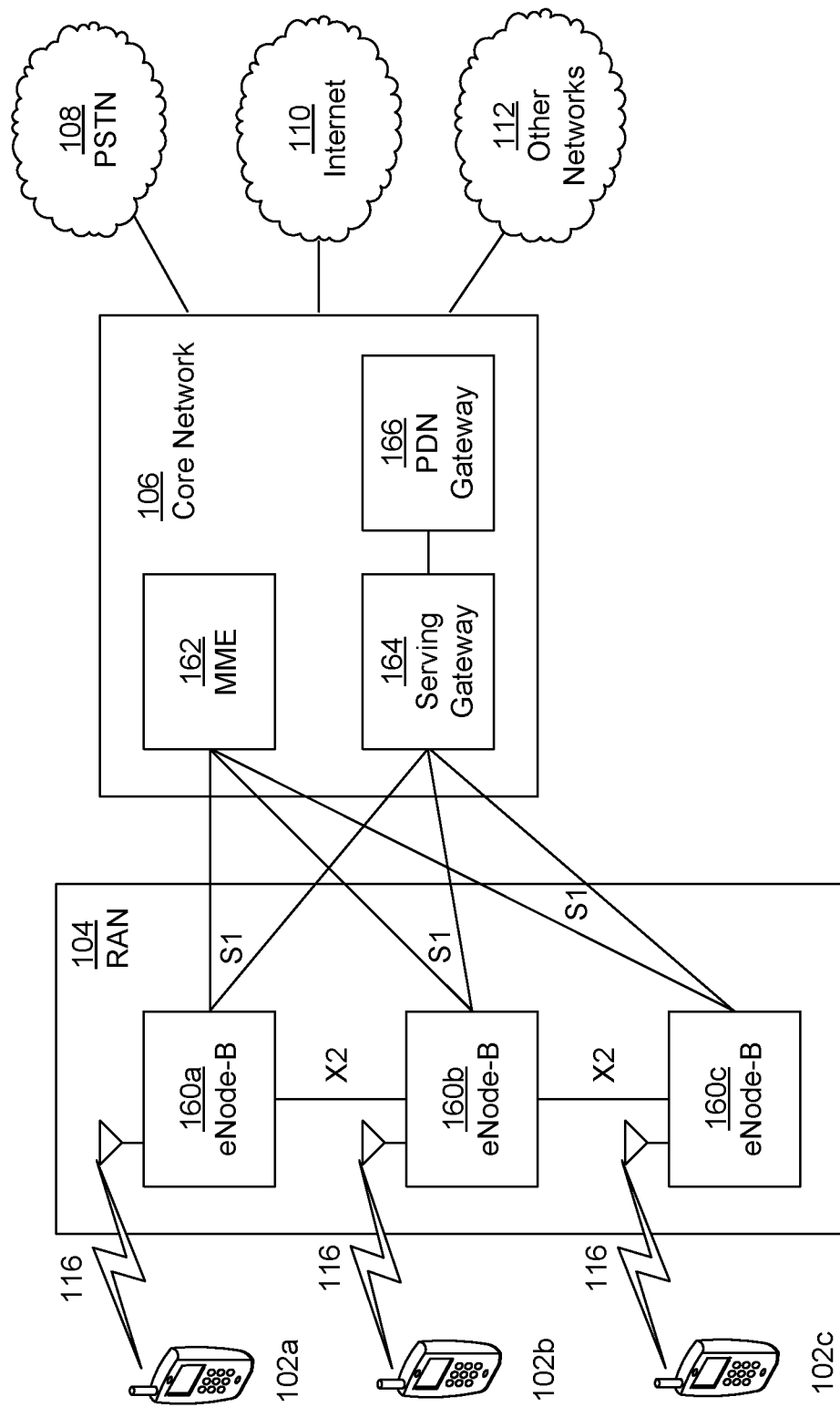
FIG. 1C is a system diagram illustrating an example radio access network (RAN) and an example core network (CN) that may be used within the communications system illustrated in FIG. 1A.

FIG. 1C is a system diagram illustrating an example RAN 104 and the CN 106. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain examples such a terminal may use (e.g., temporarily or permanently) wired communication interfaces with the communication network.

In examples, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
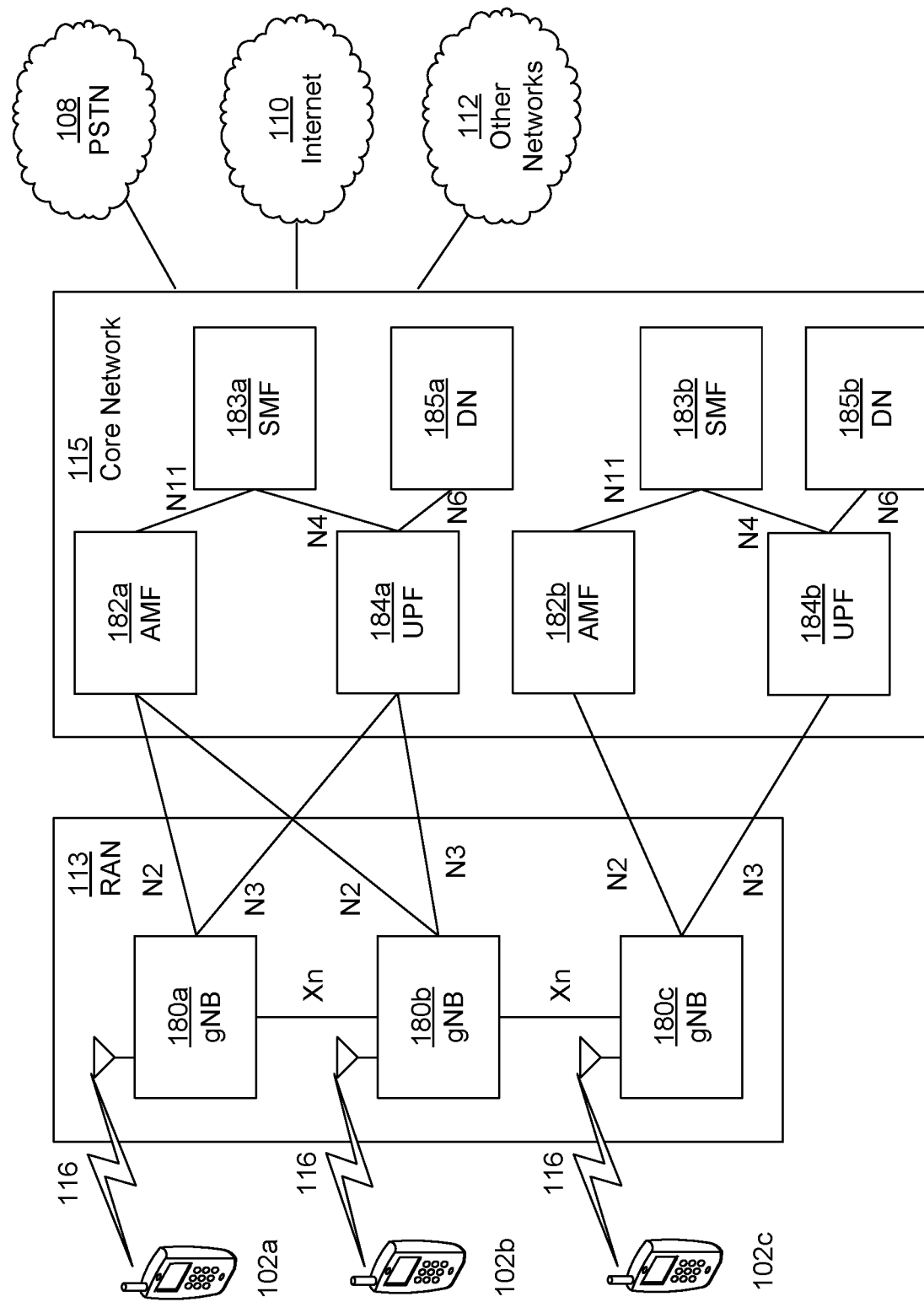
FIG. 1D is a system diagram illustrating a further example RAN and a further example CN that may be used within the communications system illustrated in FIG. 1A.

FIG. 1D is a system diagram illustrating an example RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a, 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

One or more of the following may be used: one or more (e.g., 65) angular intra prediction directions, modified coefficient coding, advanced multiple transform (AMT)+4×4 non-separable secondary transform (NSST), affine motion model, generalized adaptive loop filter (GALF), advanced temporal motion vector prediction (ATMVP), adaptive motion vector precision, decoder-side motion vector refinement (DMVR) and/or linear model (LM) chroma mode.

Figure 2:
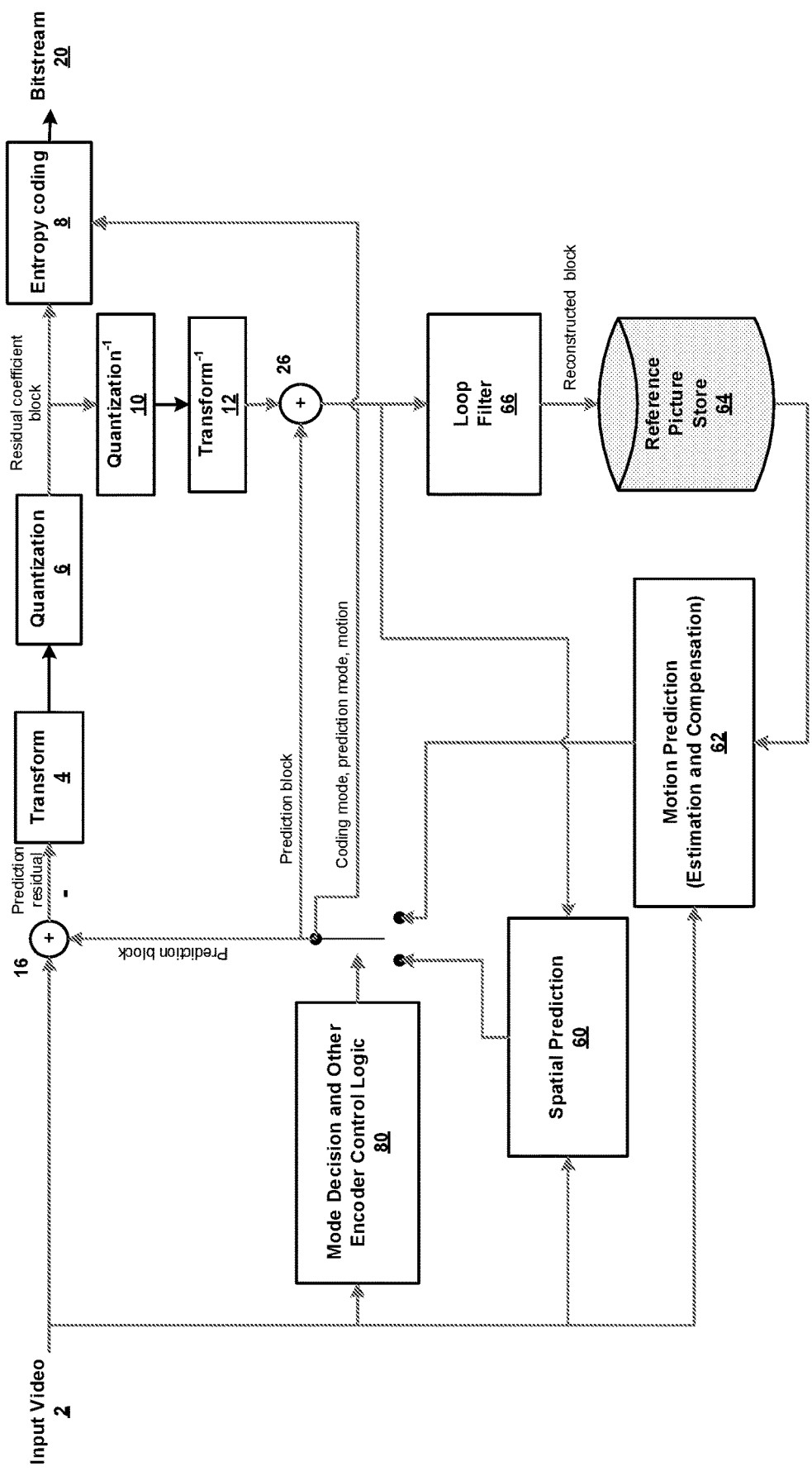
FIG. 2 shows an example diagram of a block-based video encoder.
Figure 4:
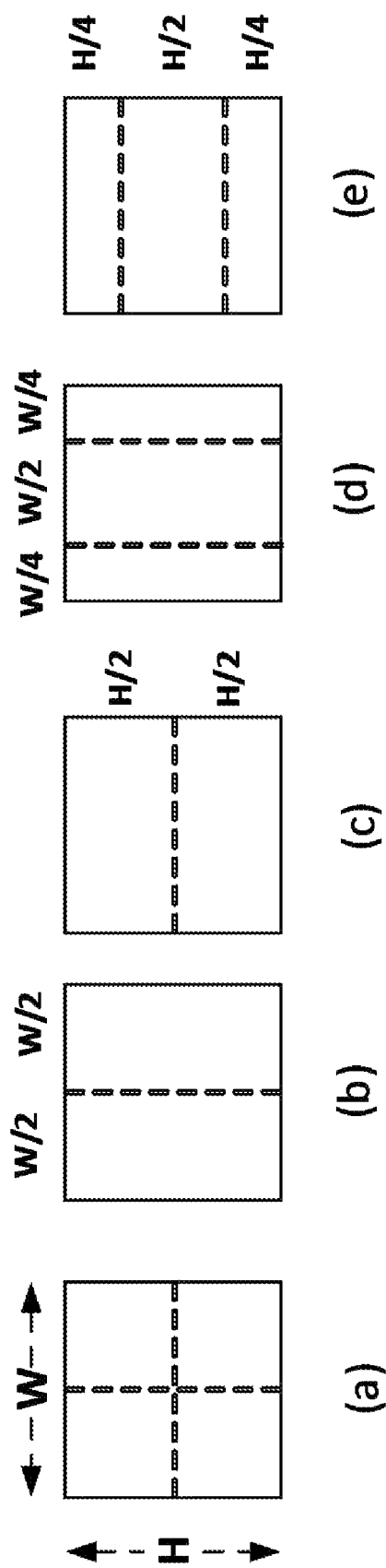
FIG. 4 shows example block partitions in a multi-type tree structure.

A block-based hybrid video coding framework may be provided. FIG. 2 gives a block diagram of an example block-based hybrid video encoder. For example, the encoder may be a WTRU. The input video signal 2 may be processed block by block. Block sizes (e.g., extended block sizes, such as a coding unit (CU)) may compress high resolution (e.g., 1080p and beyond) video signals. For example, a CU may include 128×128 pixels or more. A coding tree unit CTU may be partitioned into CUs to adapt to varying local characteristics (e.g., based on quad/binary/ternary-tree). A CU (e.g., each CU) may be used as a basic unit for prediction and/or transform (e.g., without further partitions). In a multi-type tree structure, a CTU may be partitioned by a quad-tree structure. A quad-tree leaf node (e.g., each quad-tree leaf node) may be partitioned by a binary and/or ternary tree structure. As shown in FIG. 4, there may be one or more (e.g., five) splitting types. For example, the splitting types may include quaternary partitioning, horizontal binary partitioning, vertical binary partitioning, horizontal ternary partitioning, and/or vertical ternary partitioning. For a (e.g., each) input video block (e.g., MB and/or CU), spatial prediction 60 and/or temporal prediction 62 may be performed. Spatial prediction (e.g., intra prediction) may use pixels from samples of coded neighboring blocks (e.g., reference samples) in the video picture/slice to predict the current video block. Spatial prediction may reduce spatial redundancy, for example, that may be inherent in the video signal. Temporal prediction (e.g., inter prediction and/or motion compensated prediction) may use reconstructed pixels from the coded video pictures, for example, to predict the current video block. Temporal prediction may reduce temporal redundancy, for example, that may be inherent in the video signal. Temporal prediction signals for a CU may be signaled by one or more motion vectors (MVs). The MVs may indicate the amount and/or the direction of motion between the current CU and its temporal reference. If multiple reference pictures are supported for a (e.g., each) CU, the CU's reference picture index may be sent. The reference index may be used to identify from which reference picture in the reference picture store 64 the temporal prediction signal may derive. After spatial and/or temporal prediction, the mode decision block 80 in the encoder may determine a prediction mode (e.g., the best prediction mode), for example, based on a rate-distortion optimization. The prediction block may be subtracted from the current video block 16 and/or the prediction residual may be de-correlated using transform 4 and/or quantized 6. The quantized residual coefficients may be inverse quantized 10 and/or inverse transformed 12, for example, to form the reconstructed residual, which may be added to the prediction block 26, for example, to form the reconstructed CU. In-loop filtering (e.g., a de-blocking filter) may be applied 66 on a reconstructed CU before the reconstructed CU may be put in the reference picture store 64 and/or used to code CUs (e.g., future CUs). To form the output video bit-stream 20, coding mode (e.g., inter or intra), prediction mode information, motion information, and/or quantized residual coefficients may be sent (e.g., may all be sent) to the entropy coding unit 8, for example, to be compressed and/or packed to form the bit-stream.

Figure 3:
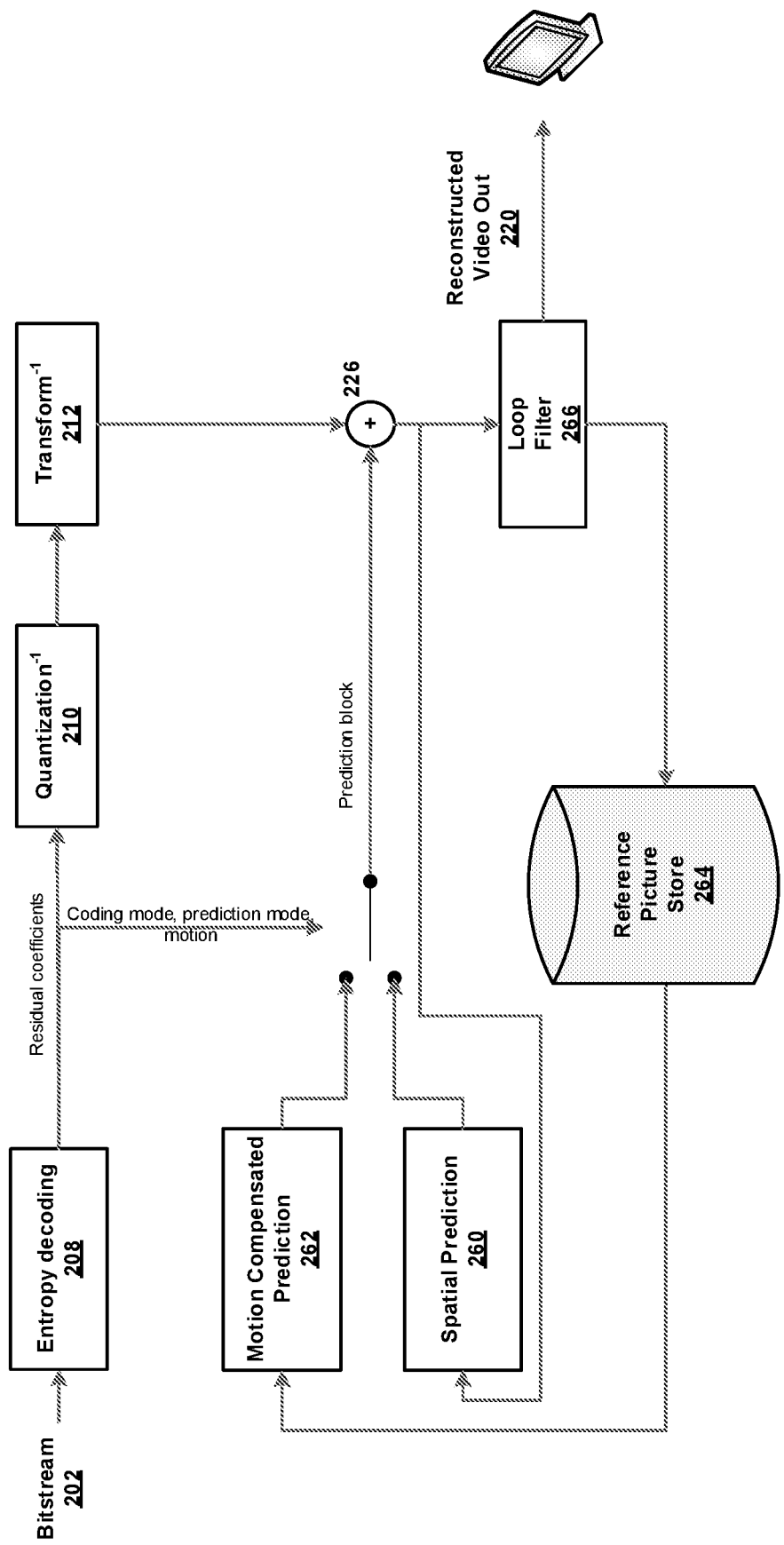
FIG. 3 shows an example block diagram of a video decoder.

FIG. 3 shows a block diagram of an example block-based video decoder. For example, the decoder may be a WTRU. The video bit-stream 202 may be unpacked (e.g., first unpacked) and/or entropy decoded at entropy decoding unit 208. The coding mode and prediction information may be sent to the spatial prediction unit 260 (e.g., if intra coded) and/or to the temporal prediction unit 262 (e.g., if inter coded) to form the prediction block. The residual transform coefficients may be sent to inverse quantization unit 210 and/or to inverse transform unit 212, e.g., to reconstruct the residual block. The prediction block and/or the residual block may be added together at 226. The reconstructed block may go through in-loop filtering, for example, before the reconstructed block is stored in reference picture store 264. The reconstructed video in the reference picture store may be sent to drive a display device and/or used to predict video blocks (e.g., future video blocks).

Coding modules (e.g., associated with temporal prediction) may be extended and/or enhanced. Affine motion compensation may be used as an inter-coding tool.

Implementations using an affine mode may be described herein. A translation motion model may be applied for motion-compensated prediction. There may be one or more kinds of motion (e.g., zoom in or out, rotation, perspective motions, and/or other irregular motions). An affine transform motion-compensated prediction may be applied. A flag for inter-coded CUs (e.g., each inter-coded CU) may be signaled, e.g. to indicate whether a translation motion model or affine motion model is applied for inter prediction. If the affine motion model is applied, a flag may be signaled to indicate the number of parameters used in the model (e.g., four or six).

Figure 5:
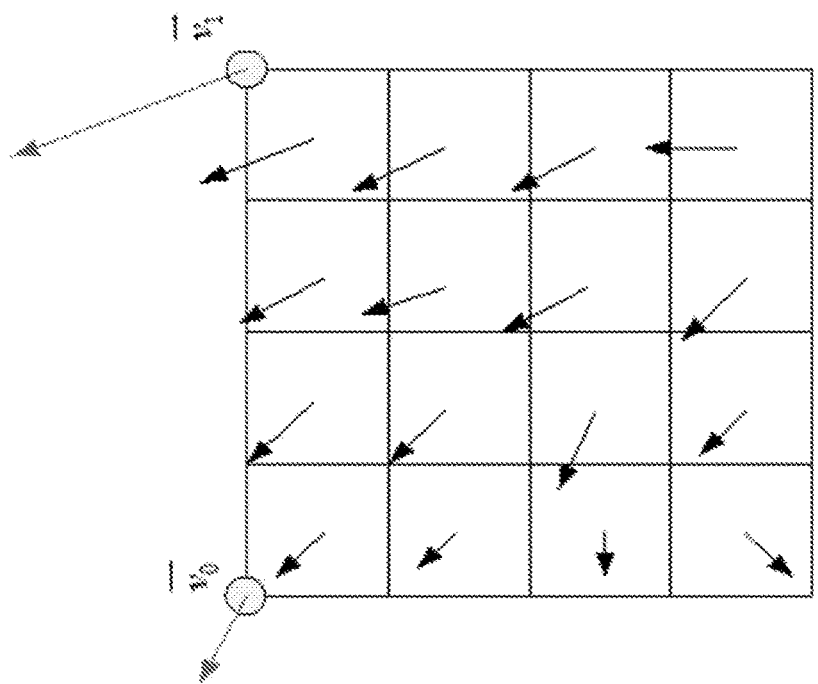
FIG. 5 shows an example of a four-parameter affine mode.
Figure 5:
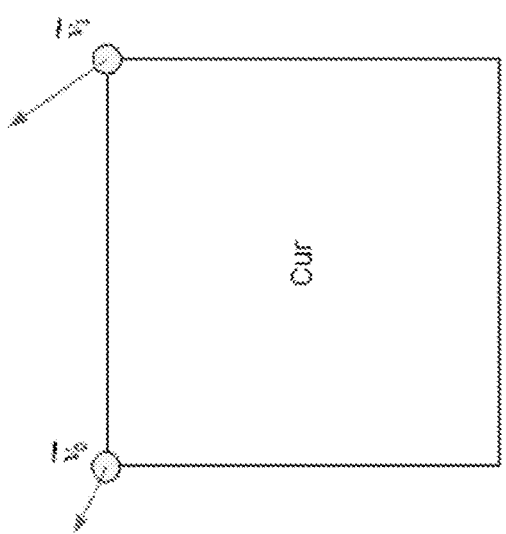

An affine motion model may be a four-parameter model. One or more (e.g., two) parameters may be used for translation movement (e.g., one for each of the horizontal and vertical directions). One or more parameters (e.g., one parameter) may be used for zoom motion. One or more parameters (e.g., one parameter) may be used for rotation motion. A horizontal zoom parameter may be equal to a vertical zoom parameter. A horizontal rotation parameter may be equal to a vertical rotation parameter. A four-parameter motion model may be coded using one or more (e.g., two) motion vectors (MVs) (e.g., as a pair) at one or more (e.g., two) control point positions defined at, for example, the top-left corner and top-right corner of a current CU. As shown in FIG. 5, an affine motion field of a block may be described by two control point motion vectors ($V_0$, $V_1$). Based on control point motion, a motion field ($v_x$, $v_y$) may be described according to the following:

$$v_x = \frac{(v_{1x} - v_{0x})}{w}x - \frac{(v_{1y} - v_{0y})}{w}y + v_{0x} \quad (1)$$

$$v_y = \frac{(v_{1y} - v_{0y})}{w}x + \frac{(v_{1x} - v_{0x})}{w}y + v_{0y}$$

where ($v_{0x}$, $v_{0y}$) may be a motion vector of the top-left corner control point, ($v_{1x}$, $v_{1y}$) may be a motion vector of the top-right corner control point, as shown in FIG. 5, and w may be the width of the CU.

Figure 6:
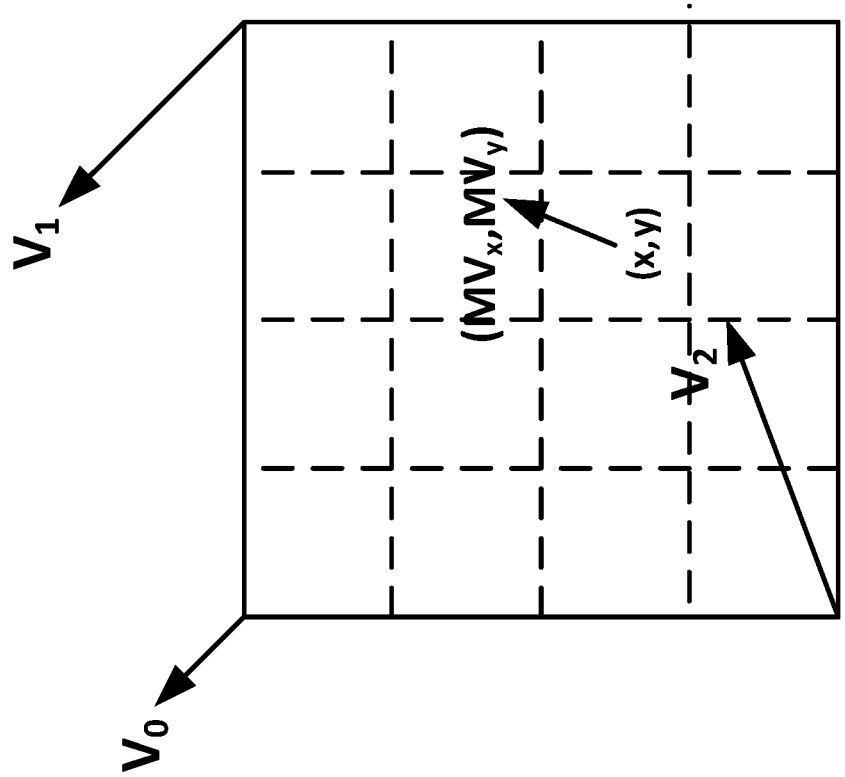
FIG. 6 shows an example of a six-parameter affine mode.

An affine motion model may be a six-parameter model. One or more (e.g., two) parameters may be used for translation movement (e.g., one for each of the horizontal and vertical directions). One or more (e.g., two) parameters may be used for zoom motion (e.g., one for each of the horizontal and vertical directions). One or more (e.g., two) parameters may be used for rotation motion (e.g., one for each of the horizontal and vertical directions). The six-parameter motion model may be coded with one or more (e.g., three) MVs at one or more (e.g., three) control points. For example, as shown in FIG. 6, the control points for a six-parameter affine coded CU may be defined at the top left, top right, and bottom left corners of the CU. The motion at the top left control point may be related to translation motion. The motion at the top right control point may be related to rotation and/or zoom motion in the horizontal direction. The motion at the bottom left control point may be related to rotation and/or zoom motion in the vertical direction. The rotation and zoom motion in the horizontal direction may be different from the motion in the vertical direction. The MV of a sub-block (e.g., each sub-block) ($v_x$, $v_y$) may be derived using one or more (e.g., three) MVs at control points according to the following:

$$v_x = v_{0x} + (v_{1x} - v_{0x}) * \frac{x}{w} + (v_{2x} - v_{0x}) * \frac{y}{h} \quad (2)$$

$$v_y = v_{0y} + (v_{1y} - v_{0y}) * \frac{x}{w} + (v_{2y} - v_{0y}) * \frac{y}{h} \quad (3)$$

where ($v_{2x}$, $v_{2y}$) may be the motion vector of the bottom-left control point, (x, y) may be the center position of the sub-block, and w and h may be the width and height of the CU, respectively.

When a block is coded with an affine motion model, its motion field may be derived based on, for example, the granularity of a sub-block. For example, to derive the MV of a sub-block (e.g., each sub-block), the MV of the center sample of the sub-block (e.g., as shown in FIG. 5) may be calculated according to Equation (1), and may be rounded to a specific accuracy (e.g., 1/16-pel accuracy). The derived MVs may be used at the motion compensation stage to generate a prediction signal of the sub-block (e.g., each sub-block) inside the current block. The sub-block size applied for affine motion compensation may be 4×4. One or more (e.g., four) parameters of the 4-parameter affine model may be estimated iteratively. For example, one or more MV pairs at step k may be denoted as $\{(v_{0x}^k, v_{0y}^k), (v_{1x}^k, v_{1y}^k)\}$. An original luminance signal may be denoted as I(i,j). A prediction luminance signal may be denoted as $I'_k(i,j)$. Spatial gradients $g_x(i,j)$ and $g_y(i,j)$ may be derived with a Sobel filter applied on the prediction signal $I'_k(i,j)$ in the horizontal and vertical directions, respectively. The derivative of Equation (1) may be represented as the following:

$$\begin{cases} dv_x^k(x, y) = c*x - d*y + a \\ dv_y^k(x, y) = d*x + c*y + b \end{cases} \quad (4)$$

where (a, b) may be delta translation parameters, and (c, d) may be delta zoom and rotation parameters at step k. The delta MV at control points may be derived with coordinates as in Equations (5) and (6). For example, (0, 0), (w, 0) may be coordinates for the top-left and top-right control points, respectively.

$$\begin{cases} dv_{0x}^k = v_{0x}^{k+1} - v_{0x}^k = a \\ dv_{0y}^k = v_{0y}^{k+1} - v_{0y}^k = b \end{cases} \quad (5)$$

$$\begin{cases} dv_{1x}^k = (v_{1x}^{k+1} - v_{1x}^k) = c*w + a \\ dv_{1y}^k = (v_{1y}^{k+1} - v_{1y}^k) = d*w + b \end{cases} \quad (6)$$

The relationship between the change of luminance and the spatial gradient and temporal movement may be formulated according to the following:

$$I'_k(i,j) - I(i,j) = g_x(i,j)*g_x(i,i) + g_y(i,j)*dv_y^k(i,i) \quad (7)$$

$dv_x^k(i,j)$ and $dv_y^k(i,j)$ may be substituted with their equivalent values in Equation (4) to obtain an equation for parameters (a, b, c, d):

$$I'_k(i,j) - I(i,j) = (g_x(i,j)*i + g_y(i,j)*j)*c + (-g_x(i,j)*j + g_y(i,j) *i)*d + g_x(i,j)*a + g_y(i,j)*b \quad (8)$$

The parameter set (a, b, c, d) may be derived using a least square implementation (e.g., since the samples in the CU satisfy Equation (8)). The MVs at the control points $\{(v_{0x}^{k+1}, v_{0y}^{k+1}), (v_{1x}^{k+1}, v_{1y}^{k+1})\}$ at step (k+1) may be solved with Equations (5) and (6), and they may be rounded to a specific precision (e.g., 1/4 pel). Using iteration, the MVs at one or more (e.g., two) control points may be refined until, for example, either parameters (a, b, c, d) are all zero or the number of times the iteration has been performed reaches a pre-defined limit.

One or more (e.g., six) parameters of a six-parameter affine model may be estimated. Equation (4) may be changed to the following:

$$\begin{cases} dv_x^k(x, y) = c*x + d*y + a \\ dv_y^k(x, y) = e*x + f*y + b \end{cases} \quad (9)$$

where (a, b) may be delta translation parameters, (c, d) may be delta zoom and rotation parameters for a first direction (e.g., the horizontal direction), and (e, f) may be delta zoom and rotation parameters for a second direction (e.g., the vertical direction), at step k. Equation (8) may be changed to the following:

$$I'_k(i,j)-I(i,j)=(g_x(i,j)*i)*c+(g_x(i,j)*j)*d+(g_y(i,j)*i)*e+ (g_y(i,j)*j)*f+g_x(i,j)*a+g_y(i,j)*b \quad (10)$$

The parameter set (a, b, c, d, e, f) may be derived using a least square implementation, for example by considering a sample (e.g., the samples) within a CU. The MV of the top left control point $(v_{0x}^{k+1}, v_{0y}^{k+1})$ may be calculated using Equation (5). The MV of the top right control point $(v_{1x}^{k+1}, v_{1y}^{k+1})$ and the MV of the bottom left control point $(v_{2x}^{k+1}, v_{2y}^{k+1})$ may be calculated according to the following equations:

$$\begin{cases} dv_{1x}^k = (v_{1x}^{k+1} - v_{1x}^k) = c*w+a \\ dv_{1y}^k = (v_{1y}^{k+1} - v_{1y}^k) = e*w+b \end{cases} \quad (11)$$

$$\begin{cases} dv_{2x}^k = (v_{2x}^{k+1} - v_{2x}^k) = d*h+a \\ dv_{2y}^k = (v_{2y}^{k+1} - v_{2y}^k) = f*h+b \end{cases} \quad (12)$$

Affine merge mode may be used to code a CU. If a (e.g., one) CU is coded in an affine mode, one or more (e.g., two or three) sets of MVs for control points for a reference list (e.g., each reference list) may be signaled with predictive coding. Differences between an MV and its predictor may be lossless coded. Affine merge mode may be applied by considering the local continuity of the motion field. Motion vectors at control points of a current CU may be derived with the affine motion model of its affine merge candidate selected from its neighboring blocks. If the affine merge candidate is coded with a four-parameter affine model, one or more (e.g., two) MVs at one or more (e.g., two) control points of the current CU may be derived. If the affine merge candidate is coded with a six-parameter affine model, one or more (e.g., three) MVs at three control points of the current CU may be derived.

Figure 7:
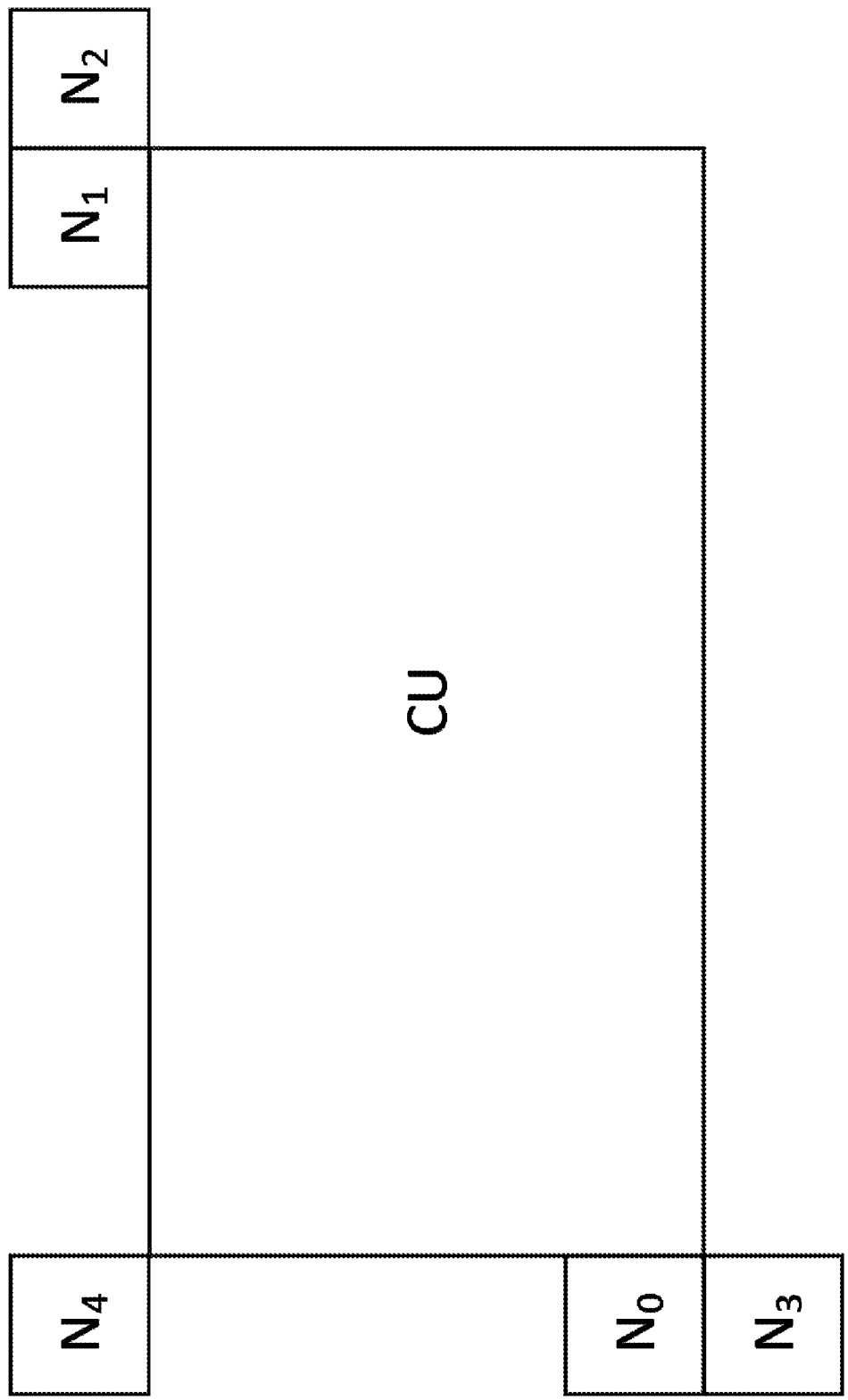
FIG. 7 shows an example of affine merge candidates.
Figure 8:
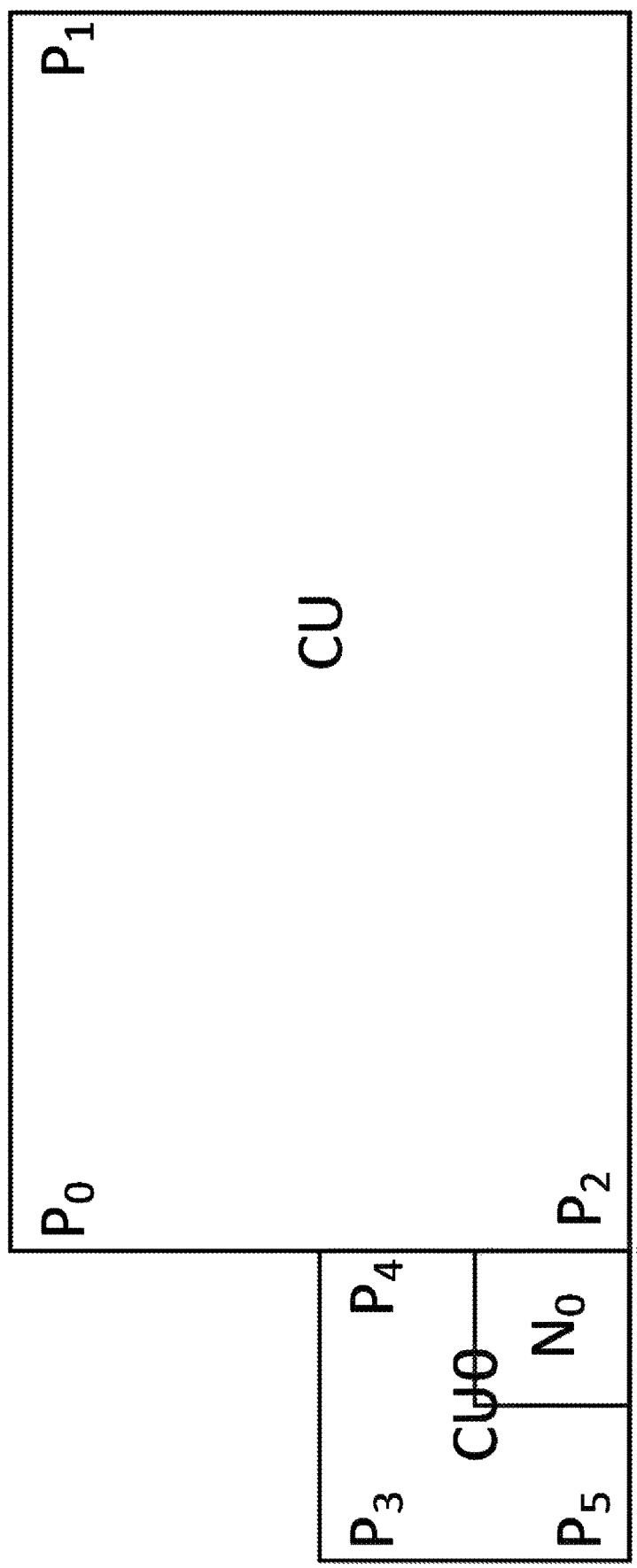
FIG. 8 shows an example of motion vector derivation at control points for an affine motion model.

If a current CU is coded with affine merge mode, there may be one or more (e.g., five) neighboring blocks (e.g., as shown in FIG. 7). The neighboring blocks may be checked in order (e.g., from $N_0$ to $N_4$). The first affine coded neighboring block may be used as an affine merge candidate. For example, as shown in FIG. 8, the current CU may be coded as affine merge mode, and the bottom left neighboring block ($N_0$) may be selected as its affine merge candidate. The width and height of the CU containing block $N_0$ may be denoted as nw and nh respectively. The width and height of the current CU may be denoted as cw and ch respectively. The MV at position $P_i$ may be denoted as $(v_{ix}, v_{iy})$. The coordinates of $P_i$ may be denoted as $(x_i, y_i)$. If block $N_0$ is coded with four-parameter affine model, one or more (e.g., two) MVs of control points may be derived. For example, the MV $(v_{0x}, v_{0y})$ at control point $P_0$ may be derived according to the following equations:

$$v_{0x} = v_{3x} + (v_{4x}-v_{3x})*\frac{(x_0-x_3)}{nw} - (v_{4y}-v_{3y})*\frac{(y_0-y_3)}{nw} \quad (13)$$

$$v_{0y} = v_{3y} + (v_{4y}-v_{3y})*\frac{(x_0-x_3)}{nw} + (v_{4x}-v_{3x})*\frac{(y_0-y_3)}{nw} \quad (14)$$

The MV $(v_{1x}, v_{1y})$ at control point $P_1$ may be derived according to the following equations:

$$v_{1x} = v_{3x} + (v_{4x}-v_{3x})*\frac{(x_0+cw-x_3)}{nw} - (v_{4y}-v_{3y})*\frac{(y_0-y_3)}{nw} \quad (15)$$

$$v_{1y} = v_{3y} + (v_{4y}-v_{3y})*\frac{(x_0+cw-x_3)}{nw} + (v_{4x}-v_{3x})*\frac{(y_0-y_3)}{nw} \quad (16)$$

If block $N_0$ is coded with a six-parameter affine model, one or more (e.g., three) MVs of control points $\{P_0, P_1, P_2\}$ may be derived according to the following equations:

$$v_{0x} = v_{3x} + (v_{4x}-v_{3x})*\frac{(x_0-x_3)}{nw} + (v_{5x}-v_{3x})*\frac{(y_0-y_3)}{nh} \quad (17)$$

$$v_{0y} = v_{3y} + (v_{4y}-v_{3y})*\frac{(x_0-x_3)}{nw} + (v_{5y}-v_{3y})*\frac{(y_0-y_3)}{nh} \quad (18)$$

$$v_{1x} = v_{3x} + (v_{4x}-v_{3x})*\frac{(x_0+cw-x_3)}{nw} + (v_{5x}-v_{3x})*\frac{(y_0-y_3)}{nh} \quad (19)$$

$$v_{1y} = v_{3y} + (v_{4y}-v_{3y})*\frac{(x_0+cw-x_3)}{nw} + (v_{5y}-v_{3y})*\frac{(y_0-y_3)}{nw} \quad (20)$$

$$v_{2x} = v_{3x} + (v_{4x}-v_{3x})*\frac{(x_0-x_3)}{nw} + (v_{5x}-v_{3x})*\frac{(y_0+ch-y_3)}{nh} \quad (21)$$

$$v_{2y} = v_{3y} + (v_{4y}-v_{3y})*\frac{(x_0-x_3)}{nw} + (v_{5y}-v_{3y})*\frac{(y_0+ch-y_3)}{nh} \quad (22)$$

After the MVs at control points $\{P_0, P_1\}$ or $\{P_0, P_1, P_2\}$ are derived, the MV of a sub-block (e.g., each sub-block) within the current CU may be derived as described herein. The derived sub-block MV may be used for sub-block based motion compensation and temporal motion vector prediction for picture coding.

Affine MVs may be predictive coded. Predictive coding may be used for non-merge affine coded CUs (e.g., to reduce signaling overhead). An affine MV predictor may be generated from the motion of neighboring coded blocks. The predictors for MV prediction of affine coded CUs may include, but are not limited to, inherited affine motion predictors derived from neighboring blocks coded with an affine motion model; constructed affine motion predictors from information from one or more neighboring blocks; and/or translation motion predictors used for MV prediction (e.g., when the number of affine predictors from other options is lower than a threshold).

Inherited affine motion predictors may be derived from one or more neighboring affine coded blocks. A neighboring block candidate list may be constructed in the same way as for affine merge mode (e.g., as shown in FIG. 7). A candidate (e.g., each candidate) in the candidate list may be checked for its MVs for one or more (e.g., two) lists, for example if the candidate block is coded in bi-prediction mode. If the reference picture of one list from a neighboring block is the same as the current reference picture, the MVs at the control points of a current block may be derived using the affine motion of the neighboring block, and may be added to the affine predictor list (e.g., after uniqueness checking).

Figure 9:
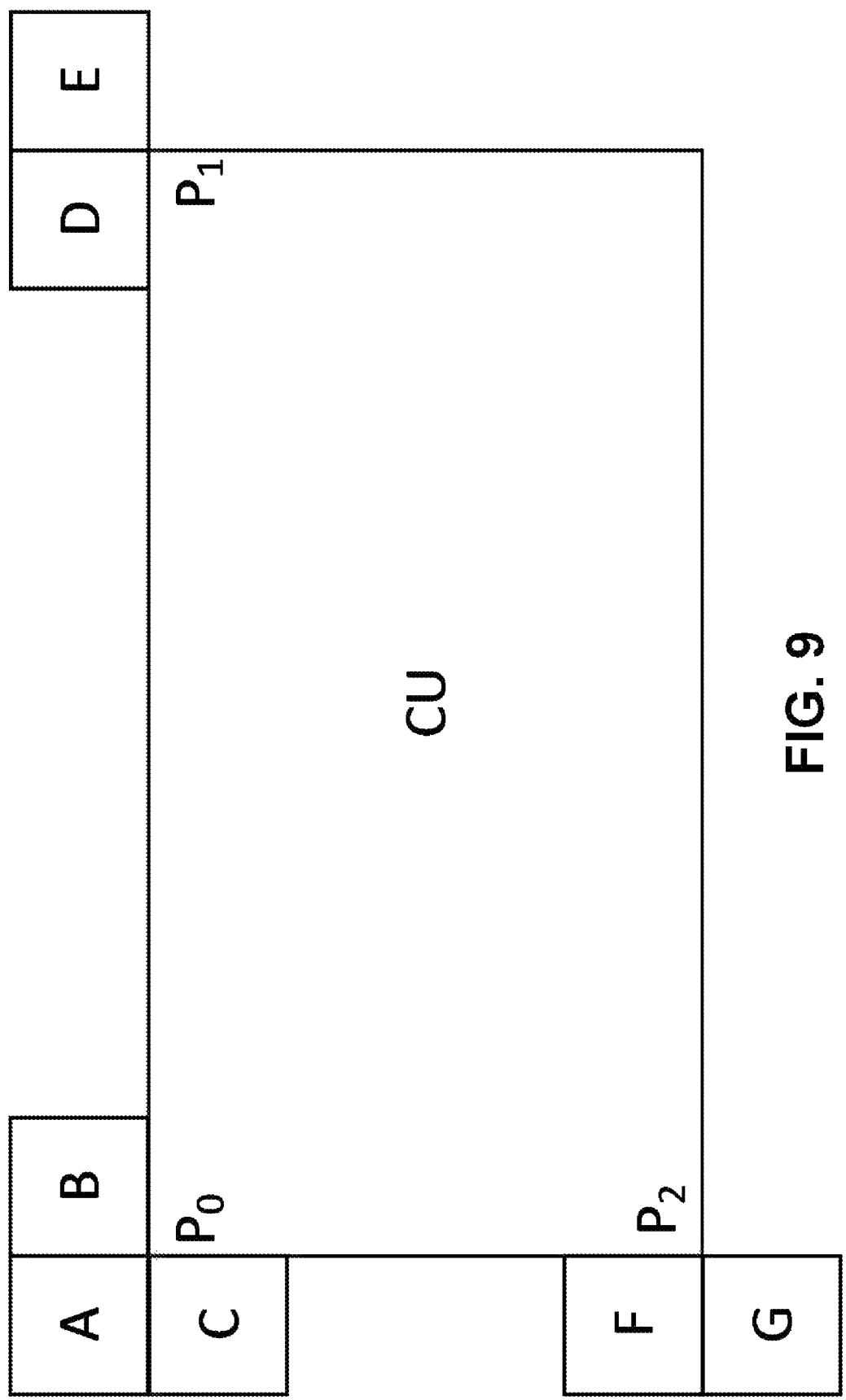
FIG. 9 shows an example affine motion vector predictor construction.

One or more (e.g., three) sets of MVs may be used to generate constructed affine motion predictors. For example, as shown in FIG. 9, the sets of MVs may be the following: the first available MV from the neighboring blocks {A, B, C} at corner $P_0$ (e.g., set S1); the first available MV from the neighboring blocks {D, E} at corner $P_1$ (e.g., set S2); and the first available MV from the neighboring blocks {F, G} at corner $P_2$ (e.g., set S3). An MV from a neighboring block may be treated as available if the neighboring block has the same reference picture as the current block. If S1 and S2 are not empty and S3 is empty, and the current block is six-parameter affine model, MVs in S1 and S2 may be treated as four-parameter affine model, and the MV may be derived at $P_2$. If S1 and S3 are not empty and S2 is empty, MVs in S1 and S3 may be treated as four-parameter affine model, and the MV may be derived at $P_1$.

For example, there may be an (e.g., one) affine predictor {$MVP_0$, $MVP'_1$, $MVP'_2$} generated as described herein for a 6-parameter affine model. The MVs for three control points may be {$MV_0$, $MV_1$, $MV_2$}. A final predictor may be derived as {$MVP_0$, $MVP'_1+(MV_0-MVP_0)$, $MVP'_2+(MV_0-MVP_0)$}. The terms "affine motion predictor" and "final predictor" may be used interchangeably herein.

Affine MV coding may be performed. If a CU is coded as an affine mode, it may be affine merge mode or affine non-merge mode. For the affine merge mode described herein, the affine MVs at the control points may be derived from affine MVs of a neighboring affine coded CU. For affine non-merge mode, the MVs at control points may be coded with differential coding. The MV predictors may be generated using the neighboring MVs as described herein. The difference between a current MV and its predictor may be coded. The MV difference to be signaled may be referred to as MVD. A four-parameter affine model may have one or more (e.g., two) control points (e.g., two MVDs may be signaled for uni-prediction, and four MVDs may be signaled for bi-prediction). A six-parameter affine model may have one or more (e.g., three) control points (e.g., three MVDs may be signaled for uni-prediction, and six MVDs may be signaled for bi-prediction). The MVD may be a two-dimensional vector (e.g., having horizontal and vertical components) and/or lossless coded.

Figure 10:
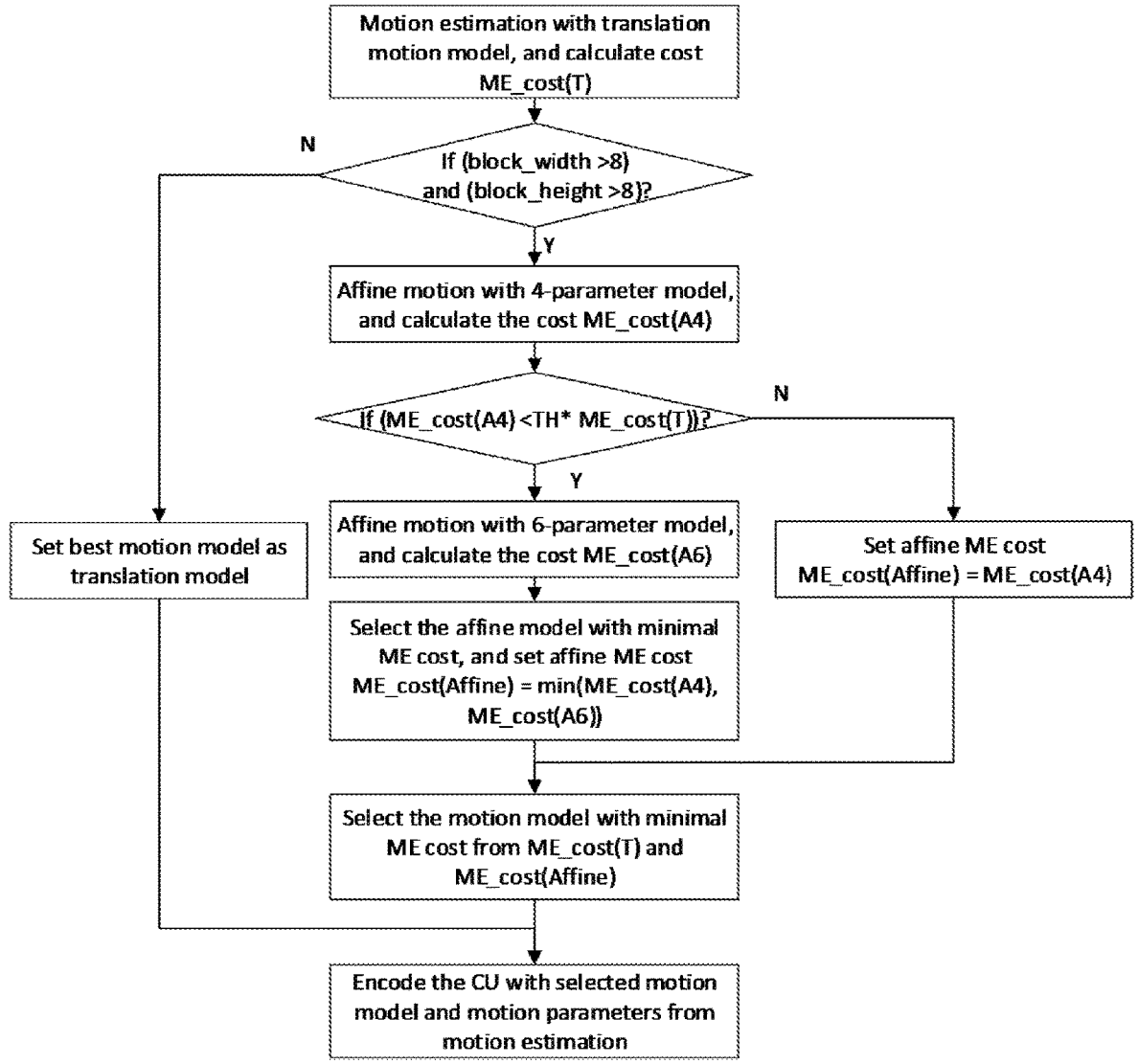
FIG. 10 shows an example motion model selection for a coding unit.

Affine motion estimation may be performed. FIG. 10 illustrates an example flowchart of motion model selection for a CU. The motion model may be selected based on a bit cost (e.g., a motion estimation (ME) cost) of one or more motion models. The ME cost may be calculated according to Equation (23), e.g., by considering the distortion measured by prediction error and the bit cost to code one or more (e.g., all) MVs:

$$\text{ME\_cost} = Dist(o, p) + \lambda \sum_{i=0}^{K-1} R(MV_i) \quad (23)$$

"o" may denote an original signal and "p" may denote a prediction signal with motion vectors {$MV_i$}. Dist(o, p) may be the distortion between signal o and p. The distortion may be evaluated by Sum of Square Error (SSE), or Sum of Absolute Differences (SAD), and/or Sum of Absolute Transformed Differences (SATD). $R(MV_i)$ may be the number of coding bits for the i-th motion vector $MV_i$. K may be the number of motion vectors. K may be 1 for translation model, 2 for a four-parameter affine model, and/or 3 for a six-parameter affine model. $\lambda$ may be a weighting factor between the distortion and the bit cost.

An encoder may check a translation motion model (e.g., first) and may calculate a bit cost (e.g., the ME cost).

If the width and/or the height of a block is greater than a threshold (e.g., 8 pixels), then affine motion estimation with four-parameter affine model may be performed. If the ME cost of a four-parameter affine model is not too much larger than the ME cost of translation motion model, the encoder may check affine motion cost with a six-parameter affine model. For example, the encoder may check the affine motion cost with a six-parameter affine model if the ME cost is approximately 100%-110% greater than the ME cost of the translation motion model. The encoder may select a motion model with the minimal ME cost from the available motion models it has already evaluated. In order to reduce the six-parameter affine motion estimation complexity, the encoder may (e.g., only) perform affine motion estimation using the best reference picture selected by four-parameter affine motion estimation. For an iteration (e.g., each iteration) of affine motion estimation, one or more (e.g., 4) actions may be performed. For example, a prediction may be generated with affine motion compensation; a spatial gradient may be calculated in one or more (e.g., two) directions (e.g., with Sobel filtering); a correlation matrix may be calculated based on the sample's gradient and its coordinates; affine model parameters may be calculated with least square method, and/or the control points' delta MVs may be calculated with the affine model parameters. A starting point for a four-parameter affine model motion search may be selected from, for example, an affine MV predictor or the MV from the translation motion model. The one with a smaller prediction error measured between the original signal and the prediction signal may be selected as a starting point for affine motion estimation. For a six-parameter affine model motion search, the control point MVs of a four-parameter affine model may be considered for starting point selection. There may be a maximum iteration limit.

Affine motion model parameter estimation may include an iterative search based on a spatial gradient of a prediction signal and a difference between an original signal and the prediction signal. The gradient information may be affected by noise. It may be difficult to control the parameter change for a step. Affine motion model parameter estimation may include high-dimensional parameter estimation, for example, four dimensions or six dimensions for four- and six-parameter affine models respectively. Motion estimation may include MV searching in one or more (e.g., two) dimensions, and searching may be adjusted during motion estimation. A block may be partitioned by different tree partitions, for example quad-tree (QT), binary tee (BT) and/or ternary tree (TT) (e.g., as shown in FIG. 4). The affine motion may be performed for a (e.g., each) coding block. There may be a correlation (e.g., a strong correlation) between the coding block and its sub-block partitioned by a tree structure. Some correlated motion information may be reused for affine motion estimation, e.g. to improve coding efficiency.

Affine motion vector (MV) candidates may be used for starting point selection for affine motion estimation. One or more affine motion predictors may be checked, for example after iterative affine motion estimation. One or more control point MVs may be refined, e.g. using a searching method. One or more spatial gradients may be calculated for affine motion estimation.

Affine motion estimation as described herein may be applied to one or more types of pictures. A hierarchical prediction structure may be used in video coding, where (e.g., depending on the temporal level to which the current picture belongs) different groups of reference pictures may be used to predict the current picture. In hierarchical prediction, for a current picture at a lowest temporal level, one or more (e.g., all) of its reference pictures may precede the current picture in display order. The current picture may be referred to as a low-delay picture. A current picture that has a (e.g., any) reference picture that follows it in display order may be referred to as a non-low-delay picture. Affine motion estimation and/or affine MV checking may be applied to the current picture (e.g., depending on its temporal level). For example, in certain situations, affine motion estimation and/or affine MV checking may be applied (e.g., only) to pictures at high temporal layers (e.g. if TL>TL_thres). Affine motion estimation and/or affine MV checking may be applied (e.g., only) to non-low-delay pictures (e.g. TL>0).

Motion estimation (ME) (e.g., affine ME) may be performed using more MV candidates (e.g., affine MV candidates) in starting point selection. While the examples described herein may be related to affine motion estimation, those skilled in the art will appreciate that the techniques may apply to motion estimations based on other models.

A cyclic list (e.g., a first-in-first-out (FIFO) list) containing one or more MVs (e.g., affine control point MVs) may be kept for current coding block ME (e.g., four-parameter affine motion estimation). The cyclic list may have a size (e.g., a maximum size) which may be four. The cyclic list may be referred to as a recently-estimated MV list. The MVs stored in the list may be the MVs searched by motion estimation (e.g., translational ME, four-parameter affine ME, and/or six-parameter affine ME). For example, a first MV set (e.g., a first MV, a first CPMV set) may be derived for a first coding block (e.g., by performing affine ME associated with the first coding block). The first MV set may be added to the recently-estimated MV list (e.g., at the head of the recently-estimated MV list). An entry (e.g., each entry) of the list may indicate the coding block position, block width and block height, and/or the MVs (e.g., control point MVs) of the four-parameter affine model associated with that coding block for a (e.g., each) reference picture. The list may be used for starting point selection. For example, a starting point for ME for a second coding block may be selected based on the MV sets in the recently-estimated MV list and/or one or more MV predictors. The starting point may be selected based on respective prediction errors of the MV sets in the recently-estimated MV list, the MV predictors, and/or one or more translational model MVs.

Given a stored control point MV set in the list, the control point MV of a current block may be derived as follows. The derivation may be similar to the MV derivation in the affine merge mode as described herein. MV(B) may denote the control point MV set of a block B for the four-parameter affine model. $\{MV_0^i(B), MV_1^i(B)\}$ may denote the control point MV set for the i-th reference picture of block B. $\{x_B, y_B\}$ and $\{x_C, y_C\}$ may denote the position of block B and the current block, respectively. $\{w_B, h_B\}$ and $\{w_C, h_C\}$ may denote the width and height of block B and the current block, respectively. The MV $(v_{0x}, v_{0y})$ at the top left control point for the i-th reference picture may be derived as follows:

$$v_{0x} = MV_{0x}^i(B) + (MV_{1x}^i(B) - MV_{0x}^i(B)) * \frac{(x_C - x_B)}{w_B} - \quad (24)$$

$$(MV_{1y}^i(B) - MV_{0y}^i(B)) * \frac{(y_C - y_B)}{w_B}$$

$$v_{0y} = MV_{0y}^i(B) + (MV_{1y}^i(B) - MV_{0y}^i(B)) * \frac{(x_C - x_B)}{w_B} + \quad (25)$$

$$(MV_{1x}^i(B) - MV_{0x}^i(B)) * \frac{(y_C - y_B)}{w_B}$$

The $MV(v_{1x}, v_{1y})$ at the top-right control point may be derived as follows:

$$v_{1x} = MV_{0x}^i(B) + (MV_{1x}^i(B) - MV_{0x}^i(B)) * \frac{(x_C + w_C - x_B)}{w_B} - \quad (26)$$

$$(MV_{1y}^i(B) - MV_{0y}^i(B)) * \frac{(y_C - y_B)}{w_B}$$

$$v_{1y} = MV_{0y}^i(B) + (MV_{1y}^i(B) - MV_{0y}^i(B)) * \frac{(x_C + w_C - x_B)}{w_B} + \quad (27)$$

$$(MV_{1x}^i(B) - MV_{0x}^i(B)) * \frac{(y_C - y_B)}{w_B}$$

If a six-parameter affine search is performed for the current block, the MV $(v_{2x}, v_{2y})$ at the bottom left control point may be derived as follows:

$$v_{2x} = MV_{0x}^i(B) + (MV_{1x}^i(B) - MV_{0x}^i(B)) * \frac{(x_C - x_B)}{w_B} - \quad (28)$$

$$(MV_{1y}^i(B) - MV_{0y}^i(B)) * \frac{(y_C + h_C - y_B)}{w_B}$$

$$v_{2y} = MV_{0y}^i(B) + (MV_{1y}^i(B) - MV_{0y}^i(B)) * \frac{(x_C - x_B)}{w_B} + \quad (29)$$

$$(MV_{1x}^i(B) - MV_{0x}^i(B)) * \frac{(y_C + h_C - y_B)}{w_B}$$

A parent block may be partitioned in multiple ways. For example, a first tree partition may partition a parent block of the second coding block into the second coding block and at least one sibling block. A second tree partition may partition the parent block of the second coding block into at least two child blocks. The first coding block may be a neighboring block of the second coding block, a sibling block of the second coding block, a parent block of the second coding block, or a child block of the parent block by the second tree partition. Each searched MV set in the recently-estimated MV list may be an MV set selected for a neighboring block of the second coding block, a sibling block of the second coding block, a parent block of the second coding block, or a child block of the parent block of the second coding block by a different tree partition.

The derived MV set may be used as an affine MV candidate for starting point selection. One or more (e.g., 3) affine MV candidates may be compared (e.g., before the encoder starts affine ME for the 4-parameter affine model) to select the starting point: one or more affine MV predictors (e.g., derived as described herein); the MV of the translation model; and the derived MV sets from an entry (e.g., each entry) of the cyclic list.

The list may be updated, for example after the encoder performs an ME (e.g., four-parameter affine ME). The searching results may be added to the list (e.g., the recently-estimated MV list) as described herein. If there is an entry in the list that has the same block position, block width and block height as the candidate to be added to the list, then the control point MVs of the entry may be updated with the MVs of the candidate to be added. The list size and the head of the list may remain the same. If there is no duplicate block in the list, the candidate may be added to the end of the cyclic list. The oldest entry of the cyclic list may be overwritten, for example, if the list is already full. The size of the list and the head of the list may be changed accordingly.

Figure 11:
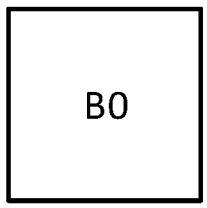
FIGS. 11(a)-(f) show example affine MV list updates, with the current head of the list shaded.
Figure 11:
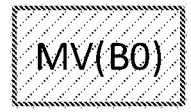
Figure 11:
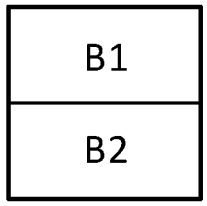
Figure 11:
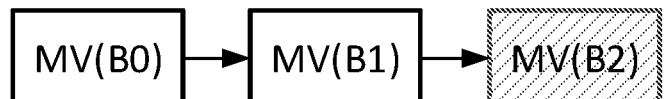
Figure 11:
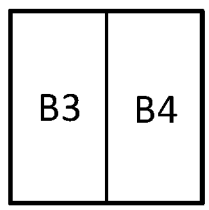
Figure 11:
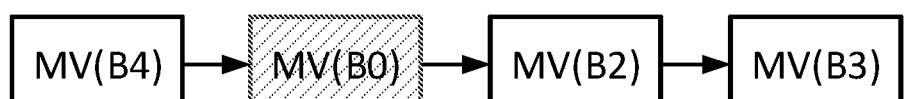
Figure 11:
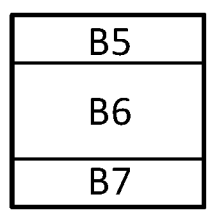
Figure 11:
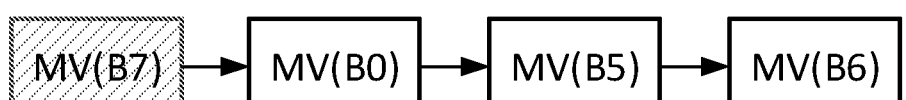
Figure 11:
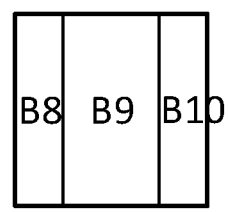
Figure 11:
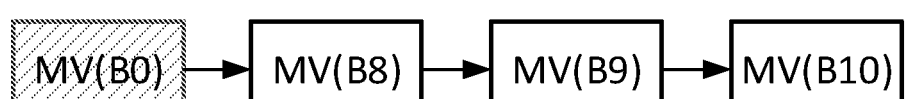
Figure 11:
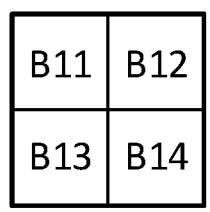
Figure 11:
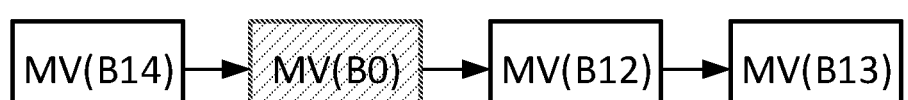

FIGS. 11 (a)-(f) show example list construction and updates. The shaded blocks in FIGS. 11(a)-(f) may indicate the current head of the cyclic list. Given the coding block B0, the encoder may try non-split mode, horizontal BT, vertical BT, horizontal TT, vertical TT and/or QT. The list may have a current size and/or a maximum size. For example, the initial list may be empty and the maximum list size may be 4. If the list has reached the maximum size, a least-recently-estimated MV set may be removed from the list before a derived MV set is added to the list. As shown in FIG. 11(a), the affine control point MVs of block B0 may be added to the list, for example after the encoder checks the non-split partition for block B0. The affine control point MVs of block B1 and B2 may be added to the list in order as shown in FIG. 11(b), for example after the encoder checks the horizontal BT partition. The affine control point MVs of a partition's parent block may be added to the list again (e.g., if it is not in the list), for example after the encoder completes the encoding of the partition. For example, if the second coding block is a last block in the first tree partition, the head of the recently-estimated MV list may be set to be an MV set associated with the parent block. The MVs of the parent block may be used for ME of its sub-block of another tree partitioning scheme. The MVs of the parent block may (e.g., always) be kept in the list before the encoder checks the new tree partitioning. FIGS. 11(c)-(f) shows the updated list after the encoder checks the vertical BT, horizontal TT, vertical TT and QT.

Starting point generation using pervious searched motion model parameters described herein may be used in a six-parameter affine model. $\{MV_0^i(B), MV_1^i(B), MV_2^i(B)\}$ may denote the control point MV set for the i-th reference picture of block B for the six-parameter affine model. The control point MV set for the i-th reference picture of the current block used for starting point selection may be derived as illustrated in Equations (30)-(35). The MV $(v_{0x}, v_{0y})$ at the top left control point for the i-th referenced picture may be derived as follows:

$$v_{0x} = MV_{0x}^i(B) + \left(MV_{1x}^i(B) - MV_{0x}^i(B)\right) * \frac{(x_C - x_B)}{w_B} + \left(MV_{2x}^i(B) - MV_{0x}^i(B)\right) * \frac{(y_C - y_B)}{h_B} \quad (30)$$

$$v_{0y} = MV_{0y}^i(B) + \left(MV_{1y}^i(B) - MV_{0y}^i(B)\right) * \frac{(x_C - x_B)}{w_B} + \left(MV_{2y}^i(B) - MV_{0y}^i(B)\right) * \frac{(y_C - y_B)}{h_B} \quad (31)$$

The MV $(v_{1x}, v_{1y})$ at the top right control point for the i-th referenced picture may be derived as follows:

$$v_{1x} = MV_{0x}^i(B) + \left(My_{1x}^i(B) - MV_{0x}^i(B)\right) * \frac{(x_C + w_C - x_B)}{w_B} + \left(MV_{2x}^i(B) - MV_{0x}^i(B)\right) * \frac{(y_C - y_B)}{h_B} \quad (32)$$

$$v_{1y} = MV_{0y}^i(B) + \left(MV_{1y}^i(B) - MV_{0y}^i(B)\right) * \frac{(x_C + w_C - x_B)}{w_B} + \left(MV_{2y}^i(B) - MV_{0y}^i(B)\right) * \frac{(y_C - y_B)}{h_B} \quad (33)$$

The MV $(v_{2x}, v_{2y})$ at the bottom left control point for the i-th referenced picture may be derived as follows:

$$v_{2x} = MV_{0x}^i(B) + \left(MV_{1x}^i(B) - MV_{0x}^i(B)\right) * \frac{(x_C - x_B)}{w_B} + \quad (34)$$

$$\left(MV_{2x}^i(B) - MV_{0x}^i(B)\right) * \frac{(y_C + h_C - y_B)}{h_B}$$

$$v_{2y} = MV_{0y}^i(B) + \left(MV_{1y}^i(B) - MV_{0y}^i(B)\right) * \frac{(x_C - x_B)}{w_B} + \left(MV_{2y}^i(B) - MV_{0y}^i(B)\right) * \frac{(y_C + h_C - y_B)}{h_B} \quad (35)$$

The derived MV set may be used as an affine MV candidate for the starting point selection for a six-parameter affine search. If the current block performs a four-parameter affine search and the entry in the cyclic list is six-parameter affine model, (e.g., only) the top left and top right MVs may be derived using Equations (30)-(33).

Figure 12:
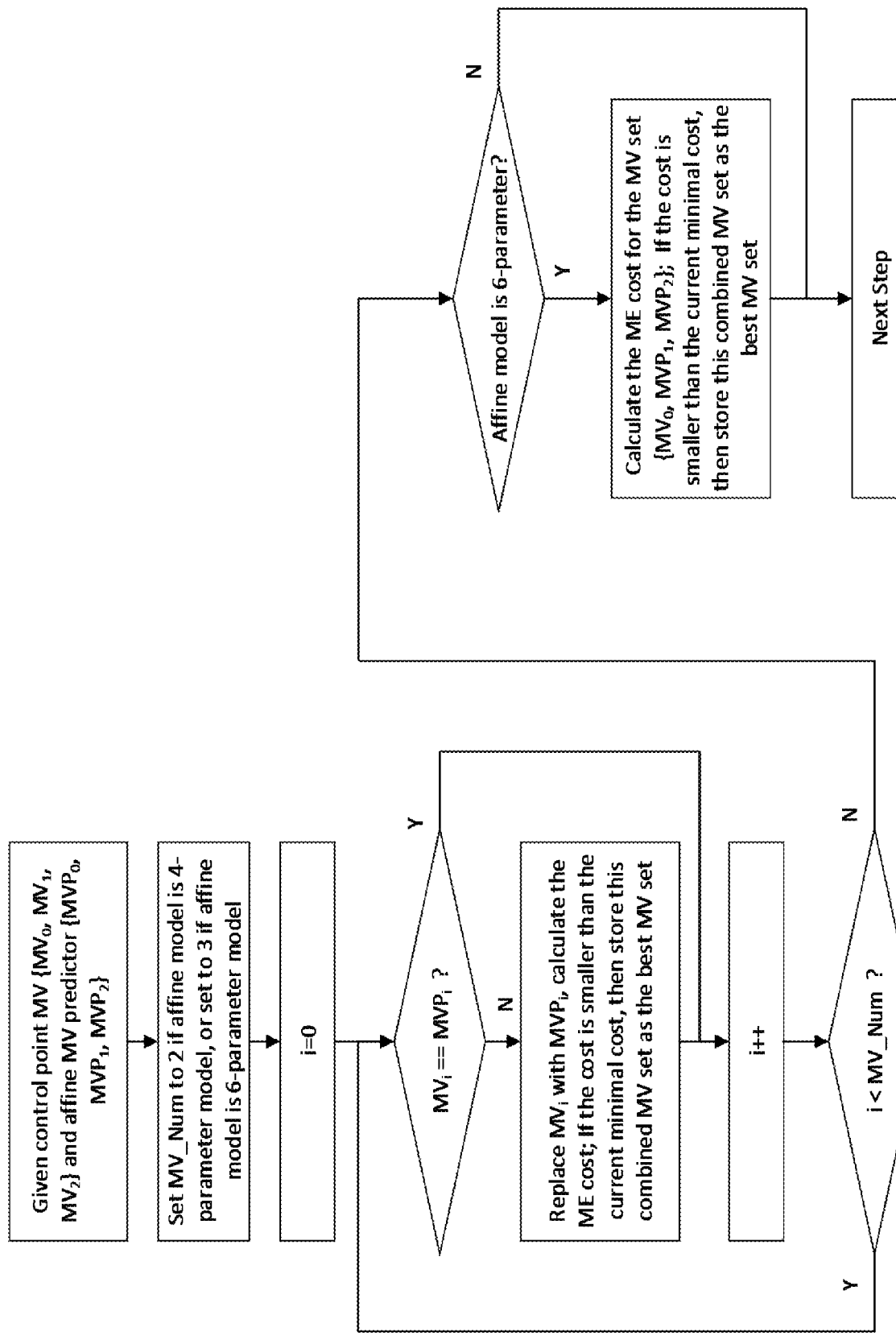
FIG. 12 shows an example additional combined MV set checking after affine motion estimation.

An encoder may consider an affine MV predictor in the affine merge mode. Using an MV predictor at a (e.g., one) control point (e.g., directly), the MVD signaling overhead for that control point's MV may be reduced. Additional MV sets may be generated by combining one or more found MVs and predictors. For example, the current block ME may be for a six-parameter affine model. An MV set (e.g., a control point MV set) and/or an MV predictor (MVP) set (e.g., an affine MVP set) may be determined for the current block. After ME (e.g., six-parameter affine ME), the control point MV set may be $\{MV_0, MV_1, MV_2\}$ for the current block. The affine MV predictor set for the current block may be $\{MVP_0, MVP_1, MVP_2\}$ for one or more (e.g., three) control points generated as described herein. It may be determined whether a first MV of the MV set is equal to a first MVP of the MVP set. If the first MV is not equal to the first MVP, the first MV in the MV set may be replaced with the first MVP to generate an MV-MVP combined set. The first MV may be, for example, $MV_0$, $MV_1$, or $MV_2$, while the first MVP may be $MVP_0$, $MVP_1$, $MVP_2$. The MV-MVP combined set generated by combining the found MVs and predictors may be one or more of the following: $\{MVP_0, MV_1, MV_2\}$, $\{MV_0, MVP_1, MV_2\}$ and/or $\{MV, MV_1, MVP_2\}$. The encoder may calculate the cost (e.g., the ME cost) described herein for a (e.g., each) MV-MVP combined set, and may compare it with cost of the MV set. For example, the cost of the MV set and/or the MV-MVP combined set may be an ME cost, and may be calculated based on a prediction error and a respective bit cost for each MV or MVP in the MV set or the MV-MVP combined set. A best MV set may be selected from the MV-MVP combined set and the MV set based on their respective ME costs. For example, the best MV set may be selected from among the MV set and each MV-MVP combined set (e.g., $\{MVP_0, MV_1, MV_2\}$, $\{MV_0, MVP_1, MV_2\}$ and/or $\{MV_0, MV_1, MVP_2\}$) based on their respective ME costs. The best MV set may be the MV set or MV-MVP combined set with the lowest ME cost. FIG. 12 shows a flowchart illustrating checking for the combined affine MVs.

A second MV of the MV set may be compared to a second MVP of the MVP set. If the second MV is not equal to the second MVP, the second MV may be replaced with the second MVP to generate a second MV-MVP combined set, which may be $\{MV, MVP_1, MVP_2\}$. The encoder may calculate the bit cost (e.g., the ME cost) of the second MV-MVP combined set. The bit cost of the second MV-MVP combined set may be compared to the bit cost of the current best MV set, and a further best MV set may be selected. For example, if the bit cost of the second MV-MVP combined set is lower than the bit cost of the current best MV set, the second MV-MVP combined set may be selected. Otherwise, the current best set may be selected.

ME may be performed based in part on potential MVD signaling overhead. The rotation and zoom parameter related MV may be derived (e.g., considering the MVD signaling overhead and/or the prediction error). A refinement (e.g., a fast refinement) may be added, for example after affine ME. MVs related to zoom and rotation parameters (e.g., only MVs related to zoom and rotation parameters) for a four-parameter affine motion model may be refined. For example, after motion estimation (e.g., affine ME), there may be an MV set $\{MV_0, MV_1\}$ for the top left and top right control points. The encoder may check $MV_1$'s nearest four neighboring MVs while fixing the top left MV as $MV_0$: $(MV_{1x}-s, MV_{1y})$, $(MV_{1x}, MV_{1y}-s)$, $(MV_{1x}, MV_{1y}+s)$, $(MV_{1x}+s, MV_{1y})$. Parameters may be a step size (e.g., ¼). The encoder may calculate the cost (e.g., the ME cost) for a (e.g., each) refined MV at the top right control point, and may compare it with the current minimal cost. In this refinement, the encoder may consider the signaling overhead when it calculates the ME cost. The encoder may refine the MV at the top left control point while fixing the top right MV. The refining process may be performed iteratively.

Spatial gradient calculation for affine ME may be performed. As described herein, one or more parameters (e.g., affine parameters) may be estimated using, for example, spatial gradients and/or a temporal difference between an original signal and a prediction signal. Spatial gradients may be calculated using a Sobel filter. A Sobel filter may be a 3×3 two-dimensional filter. A Sobel filter for horizontal gradient calculation may be $$\begin{pmatrix} -1 & 0 & 1 \\ -2 & 0 & 2 \\ -1 & 0 & 1 \end{pmatrix}.$$

A Sobel filter for vertical gradient calculation may be $$\begin{pmatrix} -1 & -2 & -1 \\ 0 & 0 & 0 \\ 1 & 2 & 1 \end{pmatrix}.$$

Figure 13:
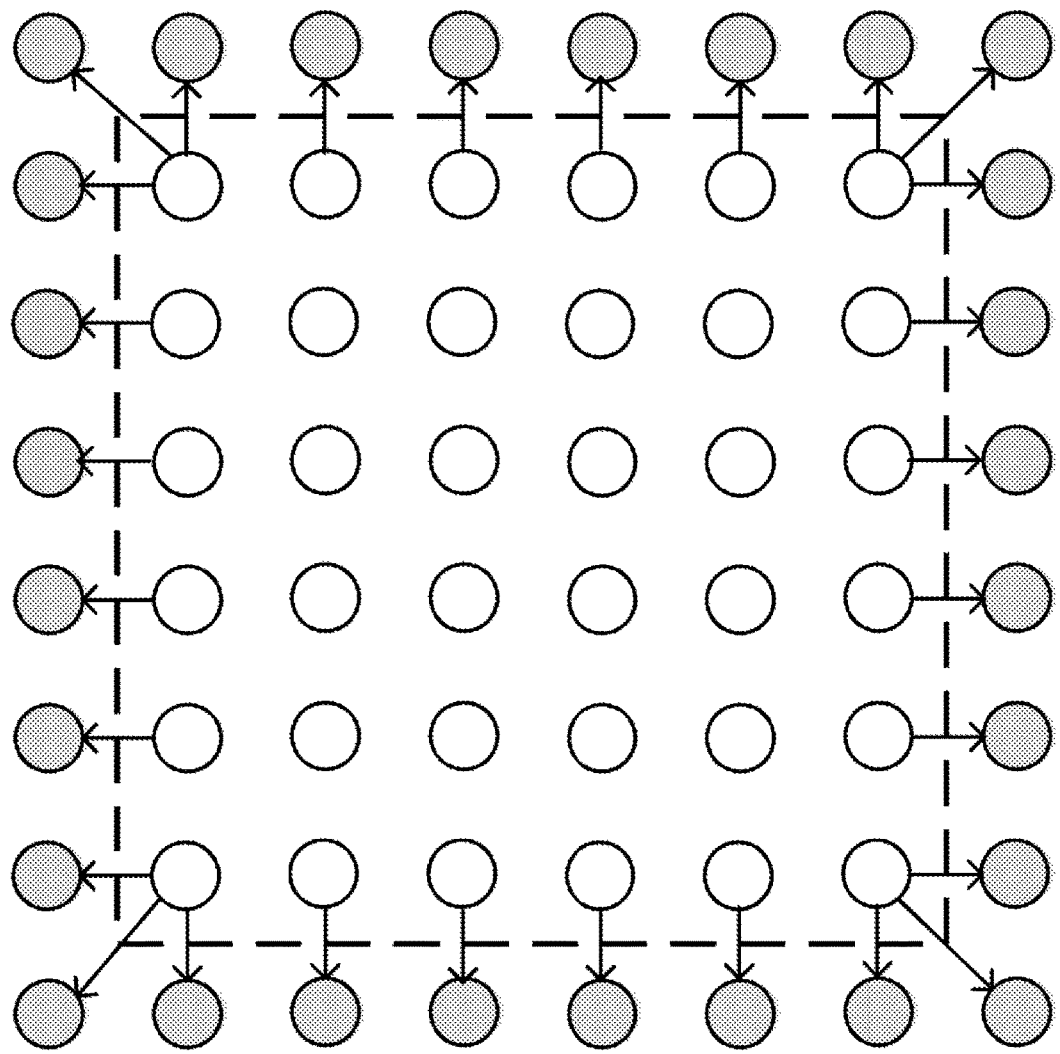
FIG. 13 shows an example gradient calculation for an 8×8 coding unit (CU).

For example, a gradient may be calculated (e.g., only) for internal samples in a CU. A CU size may be W×H, and the gradient may be calculated (e.g., only) for (W−2)×(H−2) internal samples. FIG. 13 shows an example gradient calculation for an 8×8 coding unit (CU). As shown in FIG. 13, a Sobel filter may be applied to calculate a gradient for 6×6 internal samples, and the gradient may be extended for the gradients of samples on the boundaries of the CU (e.g., the gray/solid circles shown in FIG. 13). After gradients are calculated with the Sobel filter for the internal 6×6 samples, padding may be applied for samples at the CU boundaries, for example by copying the gradient from the nearest neighbor in the 6×6 internal block.

A filter may be used for gradient calculation. A filter for horizontal gradient calculation may be (−1 0 1) and a filter for vertical gradient calculation may be $$\begin{pmatrix} -1 \\ 0 \\ 1 \end{pmatrix}.$$

Figure 14:
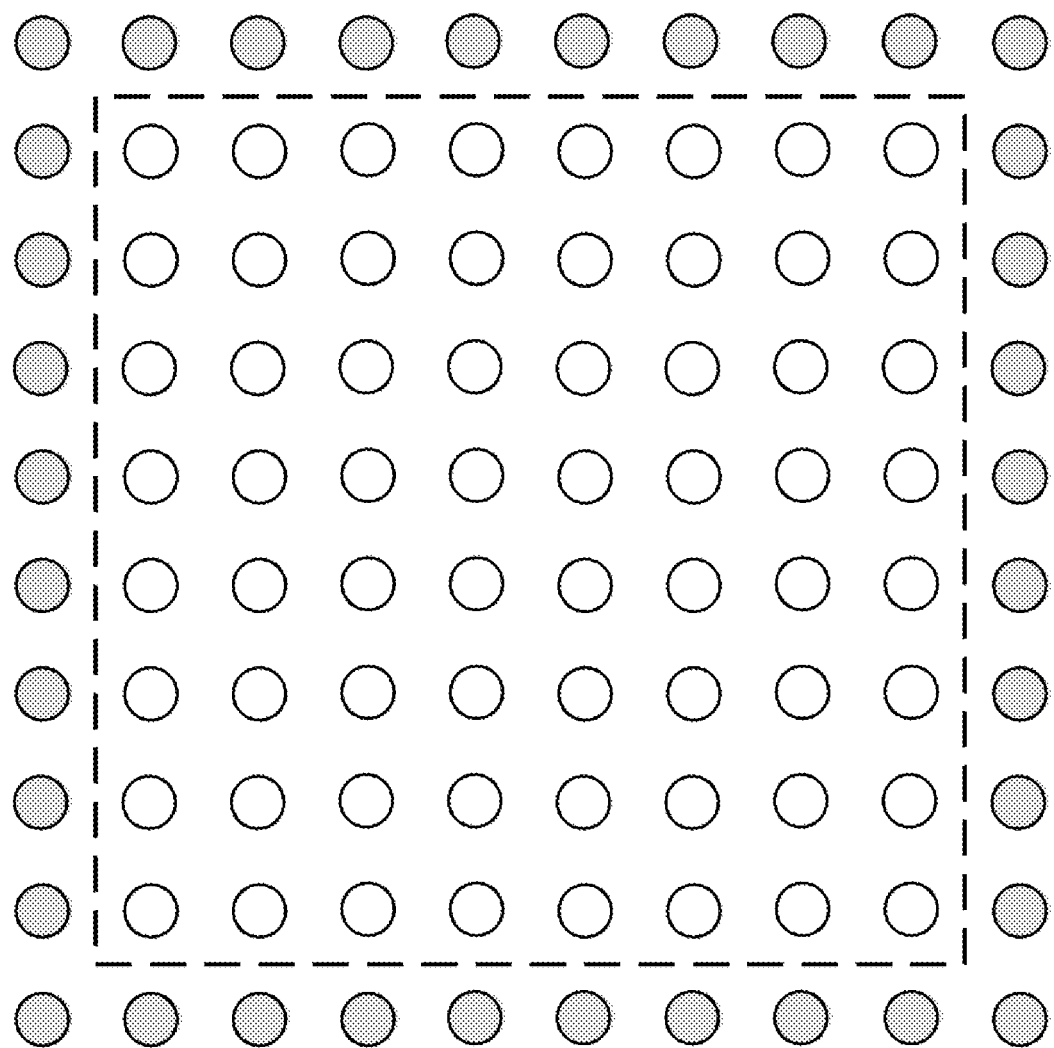
FIG. 14 shows an example gradient calculation for an 8×8 CU.

Gradient calculation complexity may be reduced. A gradient calculation for CU boundary samples may be performed. Gradient accuracy at CU boundaries may be improved. A CU may be padded by filling a row and a column at a CU boundary (e.g., each CU boundary). FIG. 14 shows an example gradient calculation for an 8×8 CU. As shown in FIG. 14, an 8×8 prediction block may be padded to a 10×10 block. Shaded circles shown in FIG. 14 may represent padded samples. A 3-tap filter may be applied to calculate a gradient for one or more 8×8 CU samples (e.g., all 8×8 CU samples) using the padded samples.

As shown in FIG. 14, the gradient for the 8×8 boundary samples may be calculated using padded samples and/or 8×8 prediction samples. Padded samples may be derived in one or more ways as described herein. Padded samples may be derived by being interpolated from a reference picture using the motion vector of the CU. Integer samples may be fetched from a reference picture buffer. Deriving padded samples via interpolation from a reference picture may be relatively accurate. Padded samples may be derived by copying from reference samples in the nearest integer positions based on the motion vector of the CU. Deriving padded samples via copying from reference samples may reduce computational complexity.

For example, a position to be padded may be (x, y). A CU MV may be (MVx, MVy). RefPic may be a reference picture buffer. RefPic(i, j) may be a sample value at integer position (i, j). A padding sample value for (x, y) may be RefPic (round(x+MVx), round(y+MVy)), where round(x) may be a function to round the input variable x to its nearest integer value.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video encoding device comprising:
a processor configured to:
during a first partition type check, partition a parent block using a first tree partition to obtain a first coding block;
perform affine motion estimation associated with the first tree partition to derive, for the first coding block, a first motion vector (MV) set;
add the first MV set to a recently-estimated MV list, wherein the recently-estimated MV list comprises a plurality of MV sets derived by performing affine motion estimation associated with the parent block;
during a second partition type check, partition the parent block using a second tree partition to obtain a second coding block;

select, for the second coding block, a starting point for affine motion estimation based at least in part on an MV set in the recently-estimated MV list and an MV predictor; and perform affine motion estimation associated with the second tree partition to derive a second MV set for the second coding block based on the selected starting point.

2. The video encoding device of claim 1, wherein deriving the second MV set comprises performing affine motion estimation associated with the second coding block based on the selected starting point.

3. The video encoding device of claim 1, wherein the first MV set comprises a plurality of control point MVs (CPMVs), and wherein the first MV set is derived by performing affine motion estimation associated with the first coding block.

4. The video encoding device of claim 1, wherein the recently-estimated MV list is a first-in-first-out (FIFO) cyclic list and wherein a size of the recently-estimated MV list is 4.

5. The video encoding device of claim 1, wherein the first tree partition partitions the parent block into the first coding block and at least one sibling block of the first coding block, and the second tree partition partitions the parent block into the second coding block and at least one sibling block of the second coding block.

6. The video encoding device of claim 1, wherein the recently-estimated MV list comprises a plurality of searched MV sets for affine motion estimation, each searched MV set in the recently-estimated MV list being an MV set selected for a neighboring block of the second coding block, a sibling block of the second coding block, the parent block of the second coding block, or a child block of the parent block of the second coding block by a different tree partition.

7. The video encoding device of claim 1, wherein the recently-estimated MV list is associated with a maximum size, and wherein the processor is further configured to:
determine whether a size of the recently-estimated MV list is equal to the maximum size; and
on a condition that the size of the recently-estimated MV list is equal to the maximum size, remove a least-recently-estimated MV set from the recently-estimated MV list.

8. The video encoding device of claim 1, wherein the processor is configured to perform affine motion estimation associated with the second coding block based on the selected starting point, and the starting point is selected based on respective prediction errors of the MV set in the recently-estimated MV list, affine MV predictors, and a translational model MV.

9. The video encoding device of claim 1, wherein the second tree partition partitions the parent block into the second coding block, and wherein on a condition that the second coding block is a last block in the second tree partition, the processor is configured to set a head of the recently-estimated MV list to be an MV set associated with the parent block.

10. The video encoding device of claim 1, wherein the processor is configured to add the first MV set at a head of the recently-estimated MV list.

11. A method comprising:
during a first partition type check, partitioning a parent block using a first tree partition to obtain a first coding block;

performing affine motion estimation associated with the first tree partition to derive, for the first coding block, a first motion vector (MV) set;

adding the first MV set to a recently-estimated MV list, wherein the recently-estimated MV list comprises a plurality of MV sets derived by performing affine motion estimation associated with the parent block;

during a second partition type check, partitioning the parent block using a second tree partition to obtain a second coding block;

selecting, for the second coding block, a starting point for affine motion estimation based at least in part on an MV set in the recently-estimated MV list and an MV predictor; and performing affine motion estimation associated with the second tree partition to derive a second MV set for the second coding block based on the selected starting point.

12. The method of claim 11, wherein deriving the second MV set comprises performing affine motion estimation associated with the second coding block based on the selected starting point.

13. The method of claim 11, wherein encoding the second coding block based on the starting point comprises performing affine motion estimation associated with the second coding block based on the selected starting point, and the starting point is selected based on respective prediction errors of the MV set in the recently-estimated MV list, affine MV predictors, and a translational model MV.

14. The method of claim 11, wherein the first MV set is added at a head of the recently-estimated MV list.

15. The method of claim 11, wherein the first MV set comprises a plurality of control point MVs (CPMVs) and wherein the first MV set is derived by performing affine motion estimation associated with the first coding block.

16. The method of claim 11, wherein the recently-estimated MV list is a first-in-first-out (FIFO) cyclic list and wherein a size of the recently-estimated MV list is 4.

17. The method of claim 11, wherein the first tree partition partitions the parent block into the first coding block and at least one sibling block of the first coding block, and the second tree partition partitions the parent block into the second coding block and at least one sibling block of the second coding block.

18. The method of claim 11, wherein the recently-estimated MV list comprises a plurality of searched MV sets for affine motion estimation, each searched MV set in the recently-estimated MV list being an MV set selected for a neighboring block of the second coding block, a sibling block of the second coding block, the parent block of the second coding block, or a child block of the parent block of the second coding block by a different tree partition.

19. The method of claim 11, wherein the recently-estimated MV list is associated with a maximum size, and wherein the method further comprises:
determining whether a size of the recently-estimated MV list is equal to the maximum size; and
on a condition that the size of the recently-estimated MV list is equal to the maximum size, removing a least-recently-estimated MV set from the recently-estimated MV list.

20. A non-transitory computer readable medium comprising instructions when executed by a processor, perform:
during a first partition type check, partition a parent block using a first tree partition to obtain a first coding block;

perform affine motion estimation associated with the first tree partition to derive, for the first coding block, a first motion vector (MV) set;

add the first MV set to a recently-estimated MV list, wherein the recently-estimated MV list comprises a plurality of MV sets derived by performing affine motion estimation associated with the parent block;

during a second partition type check, partition the parent block using a second tree partition to obtain a second coding block;

select, for the second coding block, a starting point for affine motion estimation based at least in part on an MV set in the recently-estimated MV list and an MV predictor; and perform affine motion estimation associated with the second tree partition to derive a second MV set for the second coding block based on the selected starting point.

* * * * *